United States Patent [19]

Kao

[11] Patent Number: 5,483,475

[45] Date of Patent: Jan. 9, 1996

[54] FAST PIPELINED 2-D DISCRETE COSINE TRANSFORM ARCHITECTURE

[75] Inventor: Jinn-Nan Kao, Hsinchu, Taiwan

[73] Assignee: Industrial Technology Research Institute, Taiwan

[21] Appl. No.: 121,598

[22] Filed: Sep. 15, 1993

[51] Int. Cl.$^6$ .............................. G06F 7/38; G06F 15/00; G06F 15/40

[52] U.S. Cl. ........................ 364/725; 364/726; 364/754

[58] Field of Search .................................. 364/725, 726, 364/754, 757, 736, 715.01, 715.04

[56] References Cited

U.S. PATENT DOCUMENTS

| | | | |
|---|---|---|---|
| 4,150,434 | 4/1979 | Shibayama et al. | 364/704 |
| 4,493,048 | 1/1985 | Kung et al. | 364/754 |
| 4,553,220 | 11/1985 | Swanson | 364/715.04 |
| 4,601,006 | 7/1986 | Liu | 364/726 |
| 4,603,348 | 7/1986 | Yamada et al. | 358/75 |
| 4,719,588 | 1/1988 | Tatemichi et al. | 364/754 |
| 4,769,790 | 6/1988 | Yamashita | 365/189 |
| 4,787,057 | 11/1988 | Hammond | 364/754 |

(List continued on next page.)

OTHER PUBLICATIONS

Shin–ichi Uramoto, Yoshitsugu Inoue, Akihiko Takabatake, Jun Takeda, Yukihiro Yamashita, Hideyuki Terane, and Masahiko Yoshimoto, *A 100–MHz 2–D Discrete Cosine Transform Core Processor* IEEE Journal Of Solid–State Circuits, vol. 27, No. 4 pp. 492–497 (1992).

N. Ahmed, et al., "Discrete Cosine Transform," IEEE Trans. on Computers, vol. C–23, Jan. 1974, pp. 90–93.

N. Cho, et al., "Fast Algorithm and Implementation of 2–D Discrete Cosine Transform," IEEE Transactions On Circuits And Systems, vol. 38, No. 3, Mar. 1991.

M. Sun, et al., "VLSI Implementation of a 16X16 Discrete Cosine Transform," IEEE Transactions On Circuits And Systems, vol. 36, No. 4, April 1989.

H. Hou, "A Fast Recursive Algorithm For Computing the Discrete Cosine Transform" IEEE Transactions On Acoustics, Speech, And Signal Proc., vol. ASSP–35, No. 10, Oct. 1987.

*Primary Examiner*—Roy N. Envall, Jr.
*Assistant Examiner*—Emmanuel L. Moise
*Attorney, Agent, or Firm*—Meltzer, Lippe, Goldstein et al.

[57] ABSTRACT

A DCT circuit has a pre-processor stage which receives each element $x_{ij}$ i,j=1,2,...,N, where N is an integer$\geq 4$, of an input matrix X. The pre-processor stage simultaneously outputs $Q \geq 1$ sequences of one or more columns of elements of a matrix $A_f$ having elements $a_{ij}=x_{ij}+x_{(N-i+1)j}$ i=1,2,...,N/2, j=1,2,...,N and $Q \geq 1$ sequences of one or more columns of elements of a matrix $A_r$ having elements $a_{ij}=x_{(i-N/2)j}-x_{(3N/2-i+1)j}$ i=N/2+1, N/2+2,...,N j=1,2,...,N. The DCT circuit also has a 1-D DCT processing stage which simultaneously receives each of the 2Q sequences of elements outputted by the pre-processor stage, P sequences of one or more rows of elements of an N/2×N/2 DCT cosine coefficient matrix $C_1$ and P sequences of rows of elements of an N/2×N/2 DCT cosine coefficient matrix $C_2$. The 1-D DCT processing stage has $K \geq 1$ column multiplication circuits which each simultaneously outputs a sequence of one or more vectors of elements of a matrix $Y_o$ containing the elements $Y_{ij}$ i=1,3,...,N j=1,2,...,N, where $$y_{ij} = \sum_{k=1}^{\frac{N}{2}} C_{\frac{i+1}{2} k} \times a_{kj}$$

and $K \geq 1$ column multiplication circuits which each simultaneously outputs a sequence of one or more vectors of elements of a matrix $Y_e$ comprising elements $Y_{ij}$ i=2,4,...,N j=1,2,...,N where $$y_{ij} = \sum_{k=1}^{\frac{N}{2}} C_{(\frac{i+N}{2})k} \times a_{(k+\frac{N}{2})j}$$

13 Claims, 11 Drawing Sheets

U.S. PATENT DOCUMENTS

| | | | |
|---|---|---|---|
| 4,791,598 | 12/1988 | Liou et al. | 364/725 |
| 4,841,469 | 6/1989 | Kuenemund et al. | 364/754 |
| 4,903,231 | 2/1990 | Artieri | 364/900 |
| 4,918,527 | 4/1990 | Penard et al. | 358/160 |
| 4,937,776 | 6/1990 | Myers et al. | 364/736 |
| 5,038,312 | 8/1991 | Kojima | 364/736 |
| 5,042,007 | 8/1991 | D'Luna | 365/78 |
| 5,053,985 | 10/1991 | Friedlander et al. | 364/725 |
| 5,177,704 | 1/1993 | D'Luna | 365/78 |
| 5,204,830 | 4/1993 | Wang et al. | 364/754 |
| 5,226,002 | 7/1993 | Wu et al. | 364/754 |
| 5,267,185 | 11/1993 | Akabane et al. | 364/736 |
| 5,291,429 | 3/1994 | Iwana et al. | 364/725 |

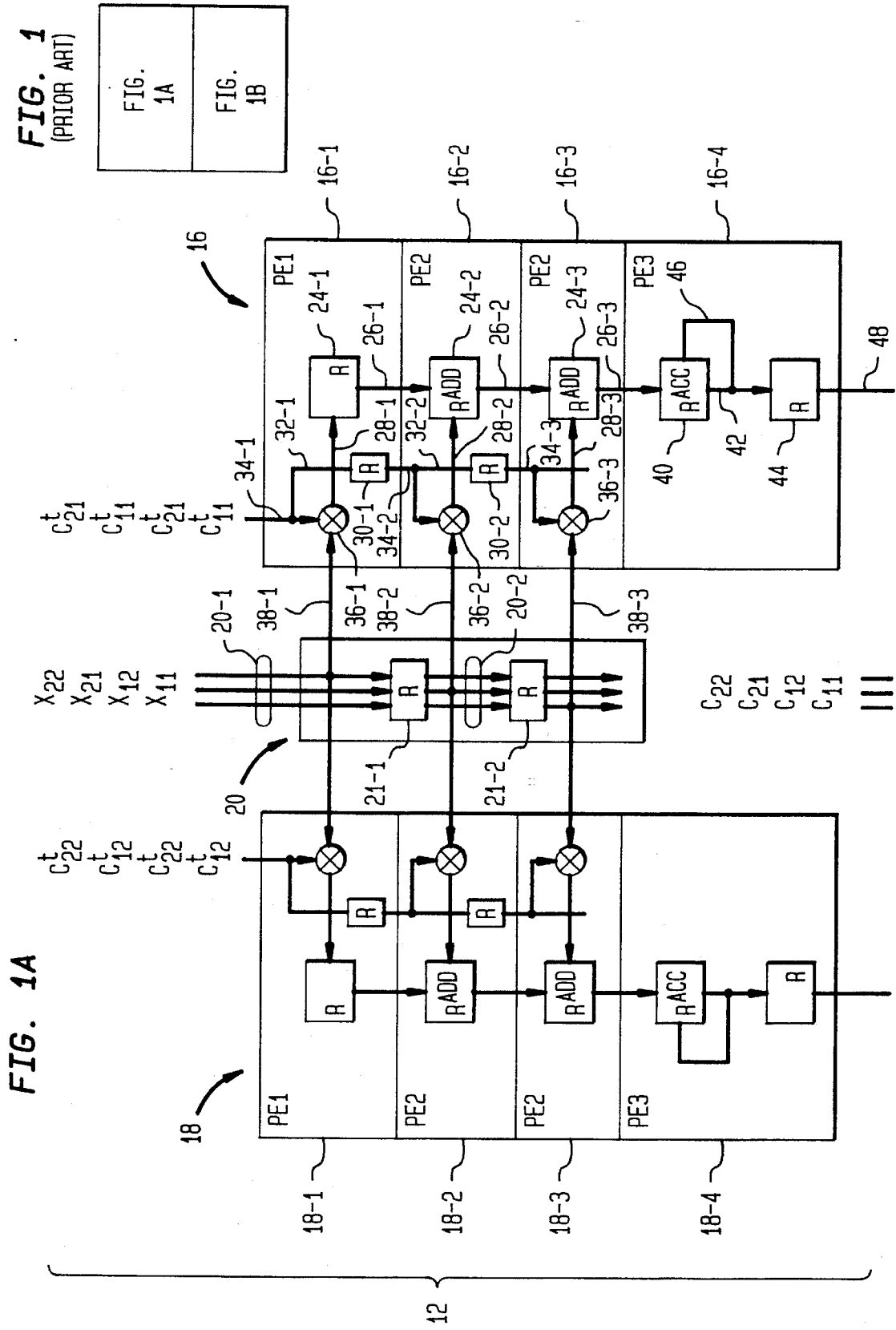

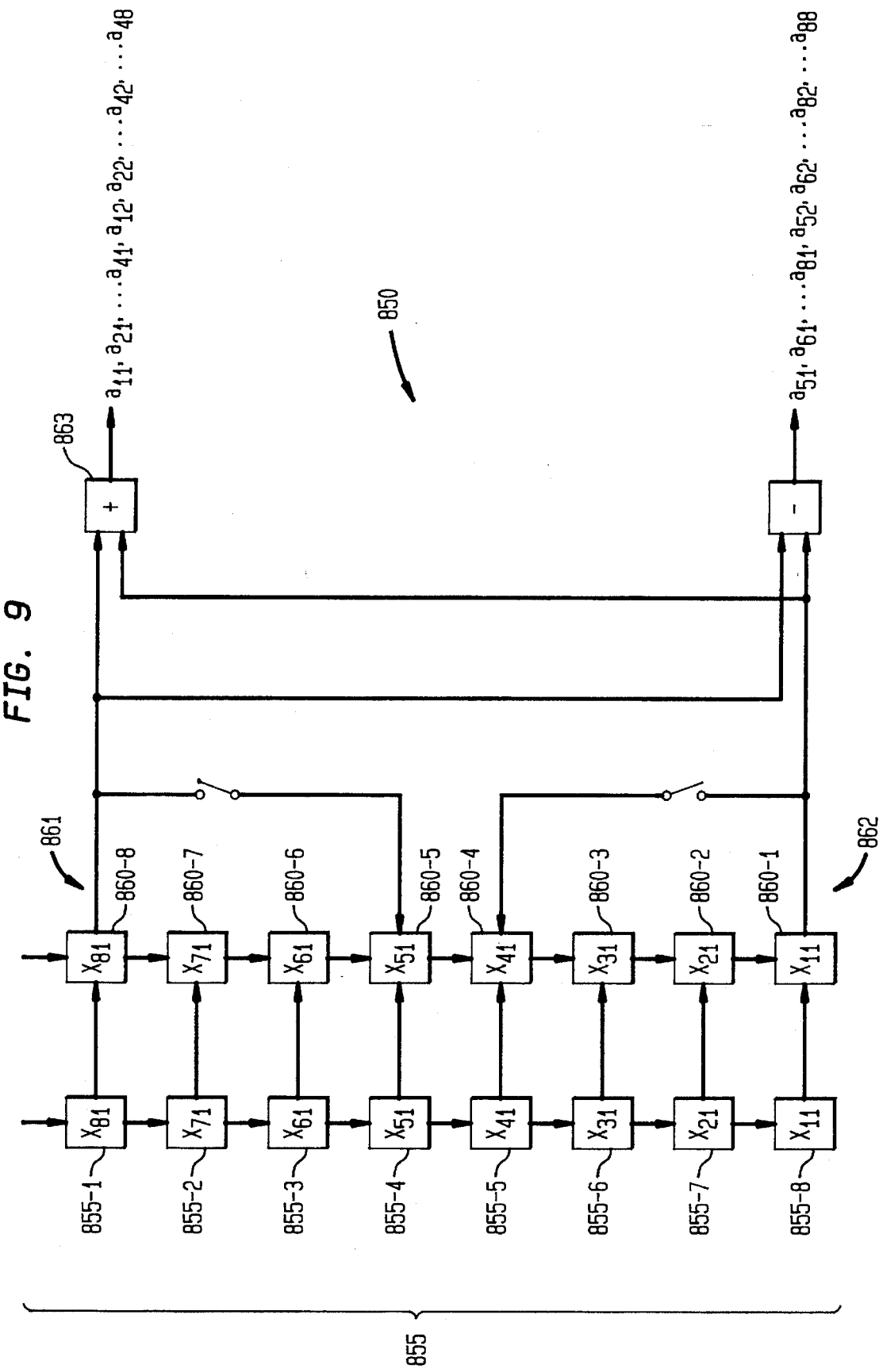

FAST PIPELINED 2-D DISCRETE COSINE TRANSFORM ARCHITECTURE

RELATED APPLICATIONS

The present invention contains subject matter related to the subject matter of the following patent and patent applications:

1. U.S. patent application Ser. No. 07/948,237, entitled "Algorithm and Circuits for Matrix Multiplication" filed Sep. 21, 1992, for Jinn-Nan Kao; and
2. U.S. Pat. No. 5,204,830, entitled "Fast Pipelined Matrix Multiplier" filed Feb. 13, 1992 for Jinn-Shyan Wang and Jinn-Nan Kao.

The above-listed patent and patent application are assigned to the assignee hereof and are incorporated herein by reference.

FIELD OF THE INVENTION

The present invention is directed to an electronic circuit for performing a Discrete Cosine Transform of an inputted matrix. In particular, the invention provides an improved Discrete Cosine Transform circuit which utilizes less area on an integrated circuit chip without reducing the processing speed of the circuit.

BACKGROUND OF THE INVENTION

The Discrete Cosine Transform (DCT) is a frequently used operation in several applications. For example, it is advantageous in the area of video image data compression to apply a two dimensional (2-D) DCT to inputted video data.

The discrete cosine transform is defined as:

$$z_{mn} = \frac{4}{N^2} c(m)c(n) \sum_{i=0}^{N-1} \sum_{j=0}^{N-1} x_{ij} \cos \frac{(2i+1)m}{2N} \cos \frac{(2j+1)n}{2N} \quad (1)$$

where $x_{ij}$ are input elements in an N×N matrix, with i,j=0, 1, 2, ..., N−1 and where $z_{mn}$ are output elements in an N×N matrix with m,n=0,1,2, ..., N−1 and where:

$$c(m), c(n) = \begin{cases} \frac{1}{\sqrt{2}}, & m=0 \ n=0 \\ 1, & \text{otherwise} \end{cases}$$

The Inverse Discrete Cosine Transform (IDCT) is defined as:

$$x_{ij} = \sum_{m=0}^{N-1} \sum_{n=0}^{N-1} c(m)c(n) z_{mn} \cos \frac{(2i+1)m\Pi}{2N} \cos \frac{(2j+1)n\Pi}{2N} \quad (2)$$

The matrix expression for equation (1) is $$Z = CXC^t \quad (3)$$

where X is the input data matrix, C is the cosine transform matrix and $C^t$ is the transpose of the matrix C. If the input matrix X is an N×N matrix, then equation (3) may be expressed as:

$$\begin{bmatrix} z_{11}z_{12} & \cdots & z_{1N} \\ z_{21}z_{22} & \cdots & z_{2N} \\ \vdots & & \vdots \\ z_{N1}z_{N2} & \cdots & z_{NN} \end{bmatrix} = \quad (4)$$

$$\begin{bmatrix} c_{11}c_{12} & \cdots & c_{1N} \\ c_{21}c_{22} & \cdots & c_{NN} \\ \vdots & & \vdots \\ c_{N1}c_{N2} & \cdots & c_{NN} \end{bmatrix} \begin{bmatrix} x_{11}x_{12} & \cdots & x_{1N} \\ x_{21}x_{22} & \cdots & x_{2N} \\ \vdots & & \vdots \\ x_{N1}x_{N2} & \cdots & x_{NN} \end{bmatrix} \begin{bmatrix} c_{11}c_{21} & \cdots & c_{N1} \\ c_{12}c_{22} & \cdots & c_{N2} \\ \vdots & & \vdots \\ c_{1N}c_{2N} & \cdots & c_{NN} \end{bmatrix}$$

The computation of the IDCT is similar to that of the DCT except that the matrix $C^t$ is substituted for the matrix C and vice versa. Therefore, the discussion may continue with only the DCT without loss of generality. Equation (3) may be divided into two multiplications as follows:

$$Y = CX \quad (5)$$

$$Z = YC^t \quad (6)$$

where Y is an intermediate product matrix and $C^t$ is the transpose of C.

There are several conventional techniques and circuits for performing a DCT of an inputted data matrix. N. Ahmed, T. Natarajan & K. Rao, "Discrete Cosine Transform," IEEE Trans. on Computers, vol. C-23, January, 1974, 90–93 teaches a general DCT technique. N. Cho & S. Lee, "Fast Algorithm and Implementation of 2-D Discrete Cosine Transform," IEEE Trans. on Cir. & Sys., vol. 38, no. 3, March 1991, p. 297–305 discloses a circuit that computes an 2-D N×N DCT using N 1-D DCT circuits or with multiplexers and N/2 1-D DCT circuits. M. Sun, T. Chen & A. Gottlieb, "VLSI Implementation of a 16×16 Discrete Cosine Transform," IEEE Trans. on Cir. & Sys., vol.36, no. 4, April, 1989, p.610–17 teaches a 2-D DCT circuit with DCT stages having a memory for storing partial results in the matrix calculations of 1-D DCT's. H. Hou, "A Fast Recursive Algorithm For Computing the Discrete Cosine Transform," IEEE Trans. on Acoustics, Speech and Signal Processing, vol. ASSP-35, no. 10, October, 1987, p.1455–61 teaches decimation techniques for reducing an N×N DCT to an N/2×N/2 DCT.

FIG. 1 shows an efficient circuit 10 for computing the product of three matrices disclosed in U.S. Pat. No. 5,204,830 which may also be used to compute the DCT of equation (4). The circuit computes a 2×2 DCT using a first 1-D DCT stage 12 for computing $Y = XC^t$ and a second 1-D DCT stage 14 for computing the matrix $Z = CY$. The first stage 12 has a central column register circuit 20 for receiving one element of the matrix X per clock cycle and one column multiplication circuit 16 or 18 for each column of the matrix $C^t$ which column multiplication circuit 16 or 18 receives one element of the corresponding column per clock cycle. Each column multiplication circuit 16, 18 computes the elements of a corresponding column of the matrix Y using rowcolumn multiplication, i.e., by multiplying the elements of the inputted column by corresponding elements of an appropriate row of the matrix $C^t$ and adding together the products. To compute all of the elements of the column of the matrix Y, each column multiplication circuit 16 or 18 receives the elements of the corresponding column of the matrix $C^t$ N times, while the central column register circuit receives each element of the matrix X in the order from the first row to the last row. The computed elements of the matrix Y are then inputted to the second stage 14 which operates in a similar fashion as the stage 12 to compute the elements of the matrix Z.

The column multiplication circuits 16,18 have a plurality of processing elements PE1, PE2, and PE3 which compute part of a product according to Booth's algorithm. According to Booth's algorithm, a multiplicand is multiplied by an M-bit multiplier by examining each $m^{th}$ bit of the multiplier ($0 \leq m \leq M-1$) one at a time. If the $m^{th}$ bit of the multiplier is a logic '1', the multiplicand shifted m bits to the left is accumulated in a running total which, after examining the $M-1^{th}$ bit produces the product. Thus, the multiplicand 6 ('110' in binary) is multiplied with the multiplier 11 ('1011' in binary) by adding together '110' (for the $0^{th}$ bit of '1011'), 1100 (for the $1^{st}$ bit of '1011') and '110000' (for the $3^{rd}$ bit of '1011') to produce '1000010'. Each processing element PE1 16-1, PE2, 16-2, ..., PE3 16-4 computes a partial result for a particular $m^{th}$ bit, with the processing element PE3 16-4 also adding together several multiplicand-multiplier products to compute an element of the matrix Y. For example, the processing element 16-2 corresponds to the $m=1^{th}$ bit and utilizes the $m=1^{th}$ bit of the matrix element stored in the register 21-1 as a selector control bit to a multiplexer 36-2. If the bit is a logic '1', the multiplexer selects the multiplicand (inputted from the register 30-1) shifted left $m=1$ bits. If the bit is a logic '0' then the value '0' is selected. The selected value outputted from the multiplexer 36-2 is added to an accumulating result inputted from the register 24-1 using an addition register 24-2. The circuits 16 and 18 are pipelined in that they sequentially receive one pair of arguments per cycle which trickle down from processing element PE1, PE2, . . . , to processing element PE2, . . . , PE3 in an analogous fashion to an assembly line.

The circuit 10 is modular and efficient. However, it is desirable to further reduce the chip area occupied by each 1-D DCT or IDCT stage.

It is therefore an object of the present invention to overcome the disadvantages of the prior art.

SUMMARY OF THE INVENTION

These and other objects are achieved by the present invention which utilizes a combined decimation technique and pipelining technique. In a decimation technique, the symmetrical property of the distribution of cosine coefficients in the DCT (IDCT) coefficient matrices is utilized to reduce the transform from an N×N transform to an N/2×N/2 transform. In such a case, equation (5) can be rewritten as follows:

$$\begin{bmatrix} Y_o \\ Y_e \end{bmatrix} = \begin{bmatrix} C_1 & C_1 \\ C_2 & -C_2 \end{bmatrix} \begin{bmatrix} X_f \\ X_r \end{bmatrix}$$

where $Y_e$ is a matrix containing the even rows of the matrix Y, $Y_o$ is a matrix containing the odd rows of the matrix Y, $X_f$ is a matrix containing the front rows (in the upper half) of the matrix X, $X_r$ is a matrix containing the recent rows, in reverse order, (in the lower half) of the matrix X and $C_1$ and $C_2$ are N/2×N/2 DCT coefficient matrices. This equation may be rewritten as:

$$Y_o = C_1 \cdot A_f \quad (7a)$$

$$Y_e = C_2 \cdot A_r \quad (7b)$$

where:

$$A_f = X_f + X_r$$

$$A_r = X_f - X_r$$

Here $A_f$ and $A_r$ are N/2×N matrices. Likewise, the IDCT may be written as follows:

$$\begin{bmatrix} X_f \\ X_r \end{bmatrix} = \begin{bmatrix} C_1^t & C_2^t \\ C_1^t & -C_2^t \end{bmatrix} \begin{bmatrix} Y_o \\ Y_e \end{bmatrix} \quad (8)$$

where $C_1^t$ is the transpose of $C_1$ and $C_2^t$ is the transpose of $C_2$. Equation (8) may be rewritten as:

$$X_f = R + T \quad (8a)$$

$$X_r = R - T \quad (8b)$$

where $$R = C_1^t \cdot Y_o$$

$$T = C_2^t \cdot Y_e$$

Both R and T are N/2×N matrices.

According to one embodiment of the invention, a DCT circuit is provided for performing a 1-D DCT of a matrix Y=CX where, Y is an output DCT transform matrix, X is an inputted matrix and C is a cosine coefficient matrix. The circuit has a pre-processor stage which receives each element $x_{ij}$ i,j=1,2,...,N, where N is an integer $\geq 4$, of an input matrix X. The pre-processor stage simultaneously outputs $Q \geq 1$ sequences of one or more columns of elements of a matrix $A_f$ having elements $a_{ij} = x_{ij} + x_{(N-i+1)j}$ i=1,2,...,N/2, j=1,2,...,N. In addition, the pre-processor stage also simultaneously outputs $Q \geq 1$ sequences of one or more columns of elements of a matrix $A_r$ having elements $a_{ij} = x_{(i-N/2)j} - x_{(3N/2-i+1)j}$ i=N/2+1, N/2+2,...,N j=1,2,...,N. The DCT circuit also has a 1-D DCT processing stage which simultaneously receives each of the 2Q sequences of elements outputted by the pre-processor stage. In addition, the 1-D DCT processing stage receives P sequences of one or more rows of elements of an N/2×N/2 DCT cosine coefficient matrix $C_1$ and P sequences of rows of elements of an N/2×N/2 DCT cosine coefficient matrix $C_2$. The 1-D DCT processing stage has $K \geq 1$ column multiplication circuits which each simultaneously outputs a sequence of one or more vectors of elements of a matrix $Y_o$ containing the elements $y_{ij}$ i=1,3,...,N j=1,2,...,N, where $$y_{ij} = \sum_{k=1}^{\frac{N}{2}} C_{\frac{i+1}{2},k} \times a_{kj}$$

The 1-D DCT processing stage also has another $K \geq 1$ column multiplication circuits which each simultaneously outputs a sequence of one or more vectors of elements of a matrix $Y_e$ comprising elements $Y_{ij}$ i=2,4,...,N j=1,2,...,N where $$y_{ij} = \sum_{k=1}^{\frac{N}{2}} C_{(\frac{i+N}{2}),k} \times a_{(k+\frac{N}{2}),j}$$

The vectors contained in the sequences outputted from the 2K column multiplication circuits may be rows or columns depending on the particular ordering of the 2Q and 2P sequences inputted to the 1-D DCT processing stage.

Illustratively, a 2-D DCT circuit can be constructed as follows. A pre-processor stage and 1-D DCT stage as described above are provided which receive an inputted data matrix X and compute Y=CX. The outputted matrix Y is inputted to a transpose memory which outputs the transpose matrix $Y^t$. A second pre-processor stage and a second 1-D DCT stage similar to the first are also provided which compute $Z=CY^t$.

According to another embodiment of the invention, an IDCT circuit is provided for performing a 1-D IDCT of a matrix $Y=C^tZ$, where Z is an inputted transformed matrix, Y is an output matrix and $C^t$ is a transposed cosine coefficient matrix. The IDCT circuit has a 1-D IDCT processing stage which simultaneously receives $Q \geq 1$ sequences of one or more columns of elements $z_{ij}$ i=1,3, . . . ,N, j=1,2, . . . ,N, where N is an integer $\geq 4$ of a matrix $Z_o$. The 1-D IDCT stage also simultaneously receives Q sequences of one or more columns of elements $z_{ij}$ i=2,4, . . . ,N, j=1,2, . . . ,N of a matrix $Z_e$. Furthermore, the IDCT processing stage simultaneously receives $P \geq 1$ sequences of one or more rows of elements of an N/2×N/2 IDCT cosine coefficient matrix $C_1^t$ and P sequences of rows of elements of an N/2×N/2 IDCT cosine coefficient matrix $C_2^t$. The 1-D IDCT processing stage has $K \geq 1$ column multiplication circuits which each simultaneously outputs a sequence of one or more vectors of elements of a matrix R containing the elements $r_{ij}$ i=1,2, . . . ,N/2 j=1,2, . . . ,N, where $$r_{ij} = \sum_{k=1}^{\frac{N}{2}} c_{ik}^t \times z_{(2k-1)j}$$

The 1-D IDCT processing stage also has $K \geq 1$ column multiplication circuits which each simultaneously outputs a sequence of one or more vectors of elements of a matrix T comprising elements $t_{ij}$ i=1,2, . . . ,N/2 j=1,2, . . . ,N where $$t_{ij} = \sum_{k=1}^{\frac{N}{2}} c_{(i+\frac{N}{2})k}^t \times z_{(2k)j}$$

The vectors of the matrices R and T outputted from the 2K column multiplication circuits may be rows or columns depending on the particular ordering of the 2Q and 2P sequences inputted to the 1-D IDCT processing stage. The IDCT circuit also has a postprocessing stage for receiving the 2K sequences of vectors of the matrices R and T. The post-processing stage outputs elements of a matrix $Y_f$ having elements $y_{ij}$ i=1,2, . . . ,N/2, j=1,2, . . . ,N where $y_{ij}=r_{ij}+t_{ij}$ and elements of a matrix $Y_r$ having elements $y_{ij}$ i=N/2+1, N/2+2, . . . ,N, j=1,2, . . . ,N where $y_{ij}=r_{(i-N/2)j}-t_{(i-N/2)j}$.

Illustratively, a 2-D IDCT circuit can be constructed in an analogous fashion as a 2-D DCT circuit using two IDCT stages, two post processing stages and a transpose memory.

In short, a DCT transform circuit which utilizes a combined parallel pipelining and decimation technique is disclosed. The DCT transform circuit according to this combined technique provides an efficient parallel processing solution which requires less circuitry and therefore occupies less area on an IC chip.

BRIEF DESCRIPTION OF THE DRAWING

FIG. 9 depicts a pre-processing stage for performing an 8×8 DCT.

DETAILED DESCRIPTION OF THE INVENTION

In the present invention, a combined parallel pipelining and decimation technique are used to provide an efficient DCT or IDCT circuit which utilizes little IC chip area for a desired processing speed.

Figure 2:
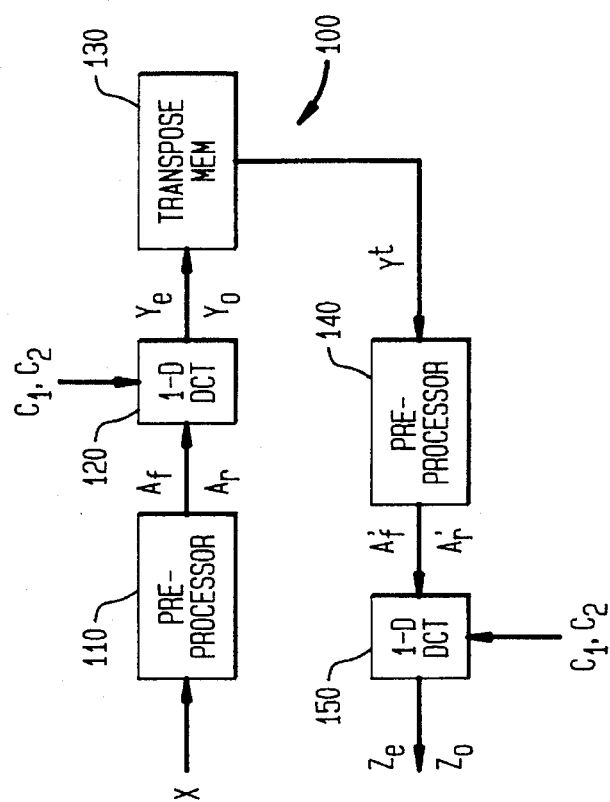
FIG. 2 depicts a 2-D DCT circuit block diagram according to a first embodiment of the invention.

FIG. 2 depicts a block diagram of a 2-D DCT circuit 100 according to a first embodiment of the present invention. The circuit 100 has a pre-processing circuit 110 which receives an input N×N data matrix X and outputs two N/2 data matrices $A_f$ and $A_r$. The matrix $A_f$ is multiplied with a first N/2×N/2 DCT cosine coefficient matrix $C_1$ in a 1-D DCT circuit 120 to produce the matrix $Y_o$ containing the odd rows of an intermediate product matrix Y. Simultaneously, the matrix $A_r$ is multiplied with a second N/2×N/2 DCT cosine coefficient matrix $C_2$ in the 1-D DCT circuit 120 to produce the matrix $Y_e$ containing the even rows of the intermediate product matrix Y. The matrices $Y_o$ and $Y_e$ are received in the transpose memory 130 which outputs the transpose matrix $Y^t$. The pre-processor circuit 140 receives the transpose matrix $Y^t$ and outputs the matrices $A'_f$ and $A'_r$. The matrix $A'_f$ is multiplied with the matrix $C_1$ in the 1-D DCT circuit 150 to produce the matrix $Z_o$. Simultaneously, the matrix $A'_r$ is multiplied with the matrix $C_2$ in the 1-D DCT circuit 150 to produce the matrix $Z_e$.

In the circuit of FIG. 2, the pre-processor circuits 110 and 140 may be identical and the 1-D DCT circuits 120 and 150 may be identical. Alternatively, the circuits 140 and 150 may be adapted to process data having more bits than the circuits 110 and 120. This is because the data words processed in the circuits 140 and 150 are likely to have more bits by virtue of the multiplication in the circuit 120.

Figure 3:
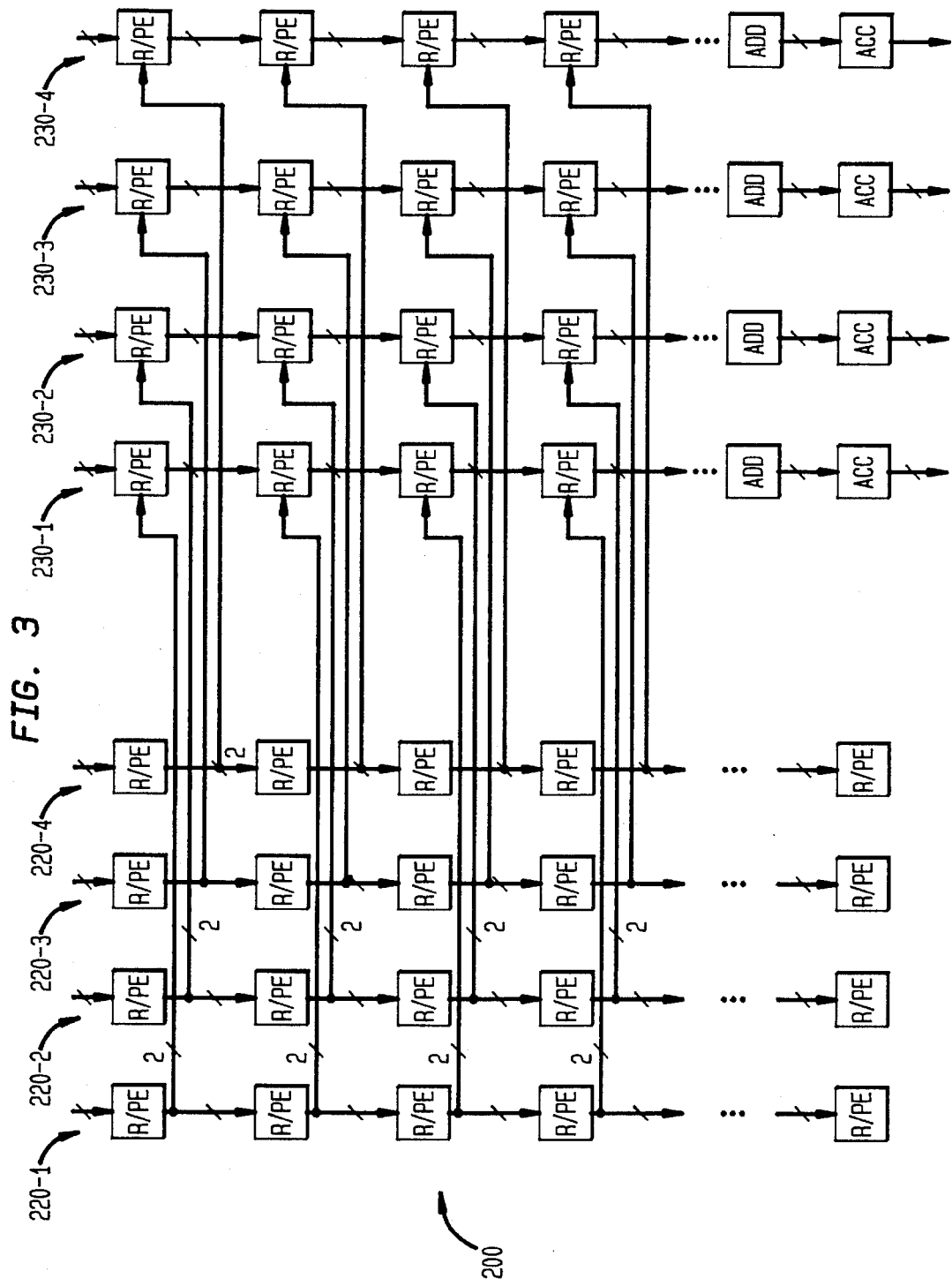
FIG. 3 depicts a 1-D DCT/IDCT processing stage according to a first embodiment of the invention.

FIG. 3 shows a 1-D DCT processing stage 200 which may be used to perform a 4×4 1-D DCT Y=CX where both X and C are 4×4 matrices. However, using a decimation technique, the 4×4 1-D DCT Y=CX is reduced two 2×2 1-D DCT's $Y_e=C_1 \cdot A_f$ and $Y_o=C_2 \cdot A_r$ where:

$$Y_e = \begin{bmatrix} y_{21} \, y_{22} \, y_{23} \, y_{24} \\ y_{41} \, y_{42} \, y_{43} \, y_{44} \end{bmatrix}, \quad Y_o = \begin{bmatrix} y_{11} \, y_{12} \, y_{13} \, y_{14} \\ y_{31} \, y_{32} \, y_{33} \, y_{34} \end{bmatrix}$$

$$C_1 = \begin{bmatrix} c_{11} \, c_{12} \\ c_{21} \, c_{22} \end{bmatrix}, \quad A_f = \begin{bmatrix} a_{11} \, a_{12} \, a_{13} \, a_{14} \\ a_{21} \, a_{22} \, a_{23} \, a_{24} \end{bmatrix}$$

$$C_2 = \begin{bmatrix} c_{31} \, c_{32} \\ c_{41} \, c_{42} \end{bmatrix}, \quad A_r = \begin{bmatrix} a_{31} \, a_{32} \, a_{33} \, a_{34} \\ a_{41} \, a_{42} \, a_{43} \, a_{44} \end{bmatrix}$$

Here, each $a_{ij}$ of the matrix $A_f$ is given by:

$$a_{ij} = x_{ij} + x_{(N-i+1)j}; \; i=1,2,\ldots,N/2, \; j=1,2,\ldots,N$$

and each $a_{ij}$ of the matrix $A_r$ is given by:

$$a_{ij} = x_{(i-N/2)j} - x_{(3N/2-i+1)j}; \; i=N/2+1, N/2+2, \ldots, N, \; j=1,2,\ldots,N$$

The circuit of FIG. 3 is provided with Q=2 column circuits 220-1, 220-2 for receiving Q=2 sequences of columns of elements of the matrices $A_f$ and Q=2 column circuits 220-3, 220-4 for receiving Q=2 sequences of columns of elements of the matrices $A_r$, where Q is an integer ≧1. Each circuit 220-1, . . . ,220-4 receives one element of the corresponding sequence per cycle. The 1-D DCT circuit also has P=2 column circuits 230-1 and 230-2 for receiving P=2 sequences of rows of the DCT cosine coefficient matrix $C_1$ and P=2 column circuits 230-3 and 230-4 for receiving P=2 sequences of rows of the DCT cosine coefficient matrix $C_2$. Each column circuit 230-1, . . . ,230-4 receives one element of its respective sequence per cycle.

Two types of column circuits are used in the 1-D DCT processing stage 200, register column circuits and multiplication column circuits. Such circuits are disclosed in U.S. Pat. No. 5,204,830. Furthermore, U.S. patent application Ser. No. 07/948,237 discloses modified column circuits. As such, the operation of these circuits is only explained briefly herein.

Figure 4:
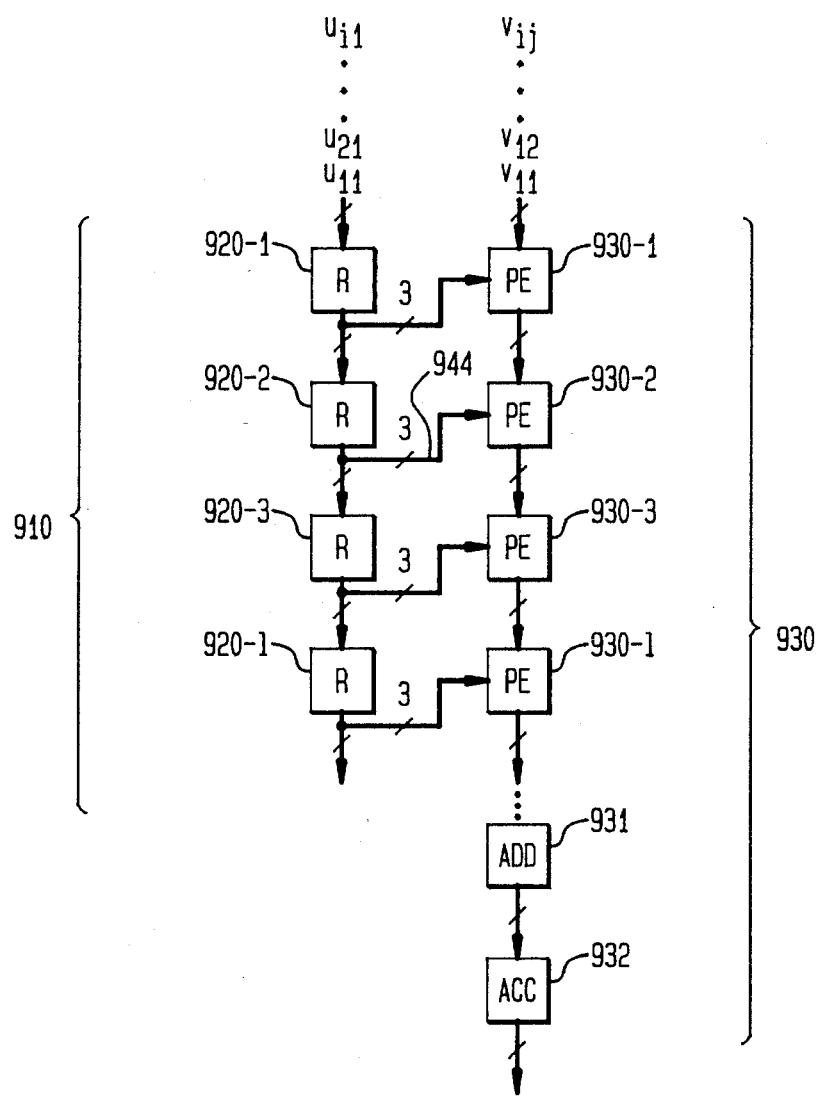
FIG. 4 depicts a column register circuit and a column multiplication circuit of FIG. 3 in greater detail.

FIG. 4 shows a column register circuit 910 having a number of registers 920-1, 920-2, . . . , 920-1 interconnected to form a serial shift register. In addition, a column multiplication circuit 930 is shown having a number of processing elements 930-1, 930-2, . . . , 930-1 interconnected in a similar sequential fashion. The column multiplication circuit 930 has an adder circuit 931 connected to the last processing element 930-1 and an accumulator 932 connected to the adder 931. Illustratively, the column register circuit 910 and column multiplication circuit 930 calculate an element of a product matrix. To that end, a sequence of elements of a column of a first matrix are inputted to one of the column circuits and a sequence of elements of a row are inputted to the other column circuit. For example, as shown, the column elements $u_{11}, u_{21}, \ldots, u_{i1}$ are inputted to the first register 920-1, one element per cycle. These elements are shifted down from register to register, (e.g., an element $u_{11}$ stored in the register 920-1 is shifted to the register 920-2 as the element $u_{21}$ is stored in the register 920-1) one register per cycle. Likewise, the row elements $v_{11}, v_{12}, \ldots, v_{1j}$ are inputted, one element per cycle to the first processing element 930-1 which elements $v_{11}, v_{12}, \ldots, v_{1j}$ trickle down the column multiplication circuit 930 processing element to processing element.

Figure 5:
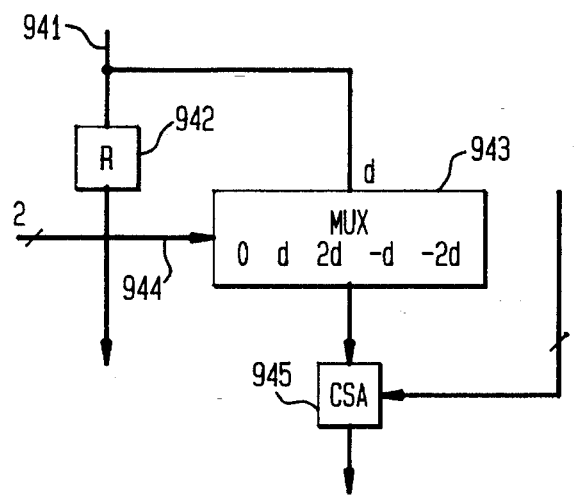
FIG. 5 depicts a processing element of the column multiplication circuit of FIG. 4 in greater detail.

Each pair of connected registers and processing elements defines a multiplication level, i.e., the register 920-1 and processing element 930-1 define a first multiplication level, the register 920-2 and the processing element 930-2 define a second level, etc. Each register, e.g., 920-2, outputs three bits of the element stored therein to a corresponding processing element, e.g., 930-2 via lines 944. The processing elements use these bits to perform a multiplication according to a modified Booth algorithm. FIG. 5 shows the circuitry used inside a processing element, e.g., the processing element 930-2, for performing a multiplication. A matrix element from a previous processing element, e.g., the processing element 930-1, in the multiplication column 930 is inputted via a line 941 to a register 942. (The first matrix element 930-1 simply receives a matrix element inputted to the column multiplication circuit 930.) The element is also fed as a data input d to a multiplexer 943 which is capable of outputting the values 0, d, 2d, −d, or −2d depending on a select control signal inputted to the multiplexer 943. The multiplexer 943 receives a three bit input via the lines 944. The particular three bits of the M bit value stored in the register are the $L+1^{th}$, $L^{th}$ and $L-1^{th}$ where L is the level of the register and processing element and $1 \leq L \leq M$ (a dummy value of 0 is used for $L-1^{th}$ bit where L is the first level). The value outputted by the multiplexer 943 based on these values is summarized in Table 1:

TABLE 1

| L + 1 | L | L − 1 | oper |
|---|---|---|---|
| 0 | 0 | 0 | 0 |
| 0 | 0 | 1 | d |
| 0 | 1 | 0 | d |
| 0 | 1 | 1 | 2d |
| 1 | 0 | 0 | −2d |
| 1 | 0 | 1 | −d |
| 1 | 1 | 0 | −d |
| 1 | 1 | 1 | 0 |

The value outputted by the multiplexer 943 is outputted to an adder 945 such as a carry save adder. The adder 945 also receives the results of the previous processing element (i.e., outputted from a similar adder circuit therein) and adds the previous results to the output of the multiplexer 943 shifted left 2(L-1) bits. (The first processing element 930-1 simply stores the value outputted from the multiplexer 943, as there is no previous result to be added.) This sum is then outputted to the adder 945 of the next processing element on the next clock. Thus, on each clock, the same pair of elements and their partial product propagate to a register or processing element and adder circuit, respectively, of a subsequent multiplication level until the last processing element is reached. At this point, if carry save adders are used, then any left over sum and carry bits are added to the result in the adder 931.

Each multiplication level may simultaneously process a different pair of elements. For example, on the clock after the first multiplication level 920-1, 930-1 processes the first two elements (e.g., $u_{11}, v_{11}$), the first multiplication level 920-1, 930-1 receives and processes the next two elements (e.g., $u_{21}, v_{12}$). Meanwhile, the second multiplication level 920-2, 930-2 processes the first two elements (i.e., $u_{11}, v_{11}$). This feature, which is analogous to the operation of an assembly line, is referred to as "pipelining". On the clock after the adder circuit 931 adds any left over carry and sum bits to the product of the first two elements, the partial product, sum and carry bits of the next two elements are inputted to the adder circuit 931.

An inspection of the sequences inputted to the register column circuit 910 and the multiplication column circuit 930 reveals that the following sequence of products are sequentially outputted from the adder circuit 931: $v_{11}u_{11}$, $v_{12}u_{21}$, $v_{13}u_{31}, \ldots, v_{1j}u_{i1}$. The accumulator 932 therefore adds up each of these elements to produce the element $w_{11}$ of the matrix product W of U and V. By appropriate selection of sequences inputted to the register and multiplication column circuits 910 and 930, it is possible to sequentially output the elements of one or more columns or rows of the product matrix W.

Returning to FIG. 3, Table 2 shows exemplary sequences inputted to each circuit 220-1, 220-2, 220-3 and 220-4.

TABLE 2

| Circuit | Sequence |
|---|---|
| 220-1 | $a_{11}, a_{21}, a_{12}, a_{22}, a_{13}, a_{23}, a_{14}, a_{24}$ |
| 220-2 | $a_{11}, a_{21}, a_{12}, a_{22}, a_{13}, a_{23}, a_{14}, a_{24}$ |
| 220-3 | $a_{31}, a_{41}, a_{32}, a_{42}, a_{33}, a_{43}, a_{34}, a_{44}$ |
| 220-4 | $a_{31}, a_{41}, a_{32}, a_{42}, a_{33}, a_{43}, a_{34}, a_{44}$ |

If the circuits 220-1, . . . ,220-4 receive the inputs shown in Table 2, then the circuits 230-1, . . . , 230-4 may illustratively receive the sequences shown in Table 3.

TABLE 3

| Circuit | Sequence |
|---|---|
| 230-1 | $c_{11}, c_{12}, c_{11}, c_{12}, c_{11}, c_{12}, c_{11}, c_{12}$ |
| 230-2 | $c_{21}, c_{22}, c_{21}, c_{22}, c_{21}, c_{22}, c_{21}, c_{22}$ |
| 230-3 | $c_{31}, c_{32}, c_{31}, c_{32}, c_{31}, c_{32}, c_{31}, c_{32}$ |
| 230-4 | $c_{41}, c_{42}, c_{41}, c_{42}, c_{41}, c_{42}, c_{41}, c_{42}$ |

Illustratively, the circuits 230-1, . . . ,230-4 are column multiplication circuits and the circuits 220-1, . . . ,220-4 are column register circuits. Alternatively, the circuits 220-1, . . . ,220-4 multiplication column circuits and the circuits 230-1, . . . ,230-4 are register column circuits. Thus, the 1-D DCT stage has 2K=4 column multiplication circuits. In the former case, the circuits 230-1, . . . ,230-4 output values shown in Table 4.

TABLE 4

| Circuit | Output Sequence |
|---|---|
| 230-1 | $c_{11}a_{11}+c_{12}a_{21}, c_{11}a_{12}+c_{12}a_{22}, c_{11}a_{13}+c_{12}a_{23}, c_{11}a_{14}+c_{12}a_{24}$ |
| 230-2 | $c_{21}a_{11}+c_{22}a_{21}, c_{21}a_{12}+c_{22}a_{22}, c_{21}a_{13}+c_{22}a_{23}, c_{21}a_{14}+c_{22}a_{24}$ |
| 230-3 | $c_{31}a_{31}+c_{32}a_{41}, c_{31}a_{32}+c_{32}a_{42}, c_{31}a_{33}+c_{32}a_{43}, c_{31}a_{34}+c_{32}a_{44}$ |
| 230-4 | $c_{41}a_{31}+c_{42}a_{41}, c_{41}a_{32}+c_{42}a_{42}, c_{41}a_{33}+c_{42}a_{43}, c_{41}a_{34}+c_{42}a_{44}$ |

Thus, K=2 column multiplication circuits 230-1 and 230-2 output the rows of the matrix $Y_o$ and K=2 column circuits 230-3 and 230-4 output the rows of the matrix $Y_e$. In the case that the column circuits 220-1, . . . ,220-4 are column register circuits, then one of the column circuits 220-1, 220-2 and one of the column circuits 220-3, 220-4 may be omitted. If the column circuits 220-2 and 220-4 are omitted, the column circuit 220-1 is connected to the column circuit 230-2 in a similar fashion as it is connected to the column circuit 230-1. Likewise, the column circuit 220-3 is connected to the column circuit 230-4 in a similar fashion as it is connected to the column circuit 230-3. In an analogous fashion, in the case that the circuits 230-1, . . . ,230-4 are the column register circuits, one of the column circuits 230-1, 230-2 and one of the column circuits 230-3, 230-4 may be omitted.

Figure 1B:
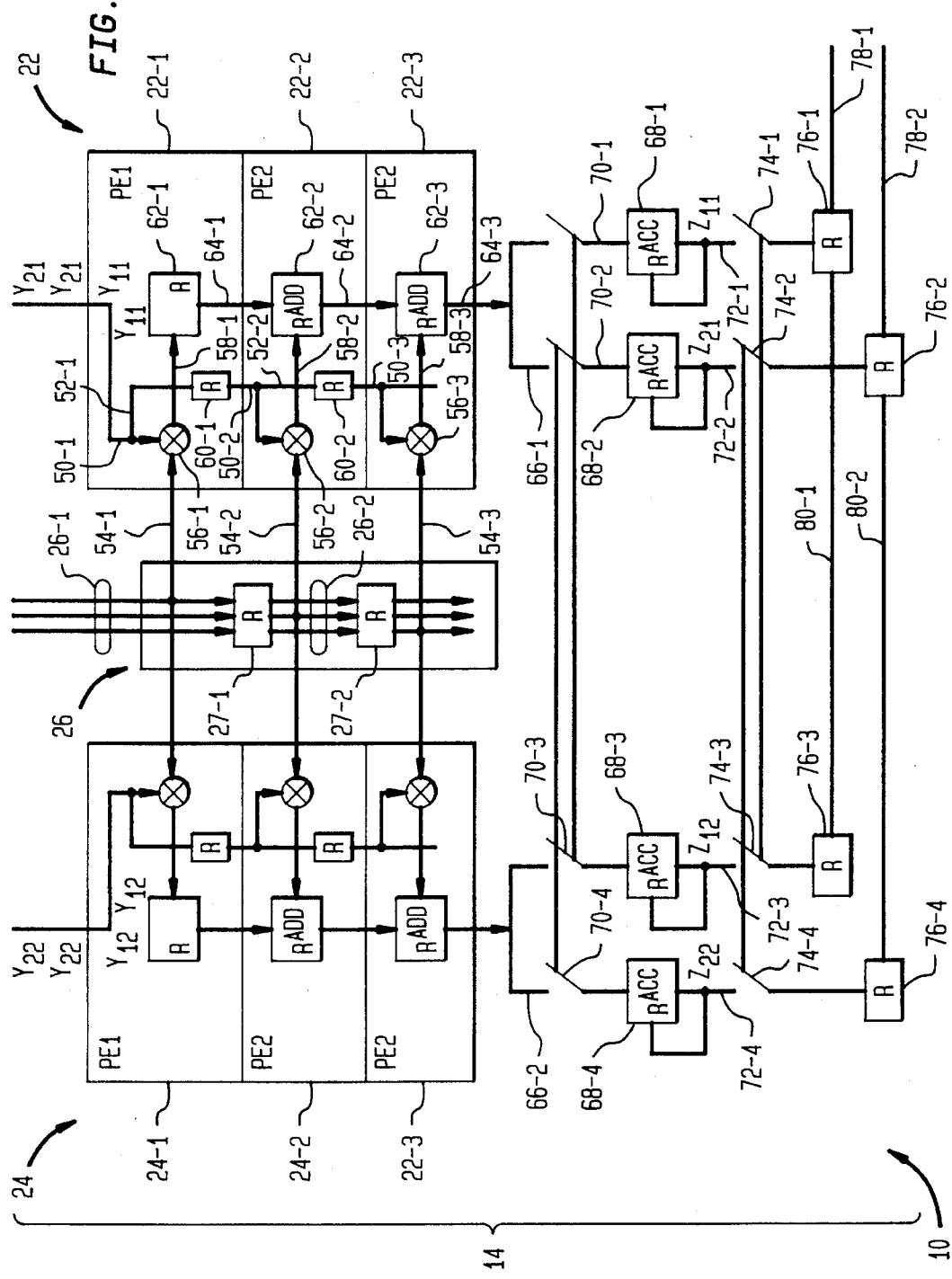
FIG. 1 depicts a conventional parallel pipeline DCT circuit.

The performance of a 1-D DCT circuit depends on how many clocks are required for receiving the input matrix elements. As shown, each column circuit receives a total of eight matrix elements, one per cycle, and thus requires eight clocks to compute the 1-D DCT of an input matrix. A comparable conventional 1-D DCT circuit such as shown in FIG. 1 with four multiplication column circuits requires sixteen clocks to receive the inputted matrices. Thus, using a decimation technique, a 1-D DCT processing stage may be provided which operates at approximately twice the speed of the conventional 1-D DCT processing stage. Alternatively, a 1-D DCT processing stage utilizing a decimation technique may be provided in which the individual processing elements of each column multiplication circuit need only operate at half the speed of the processing elements in a conventional 1-D DCT processing stage.

Figure 6:
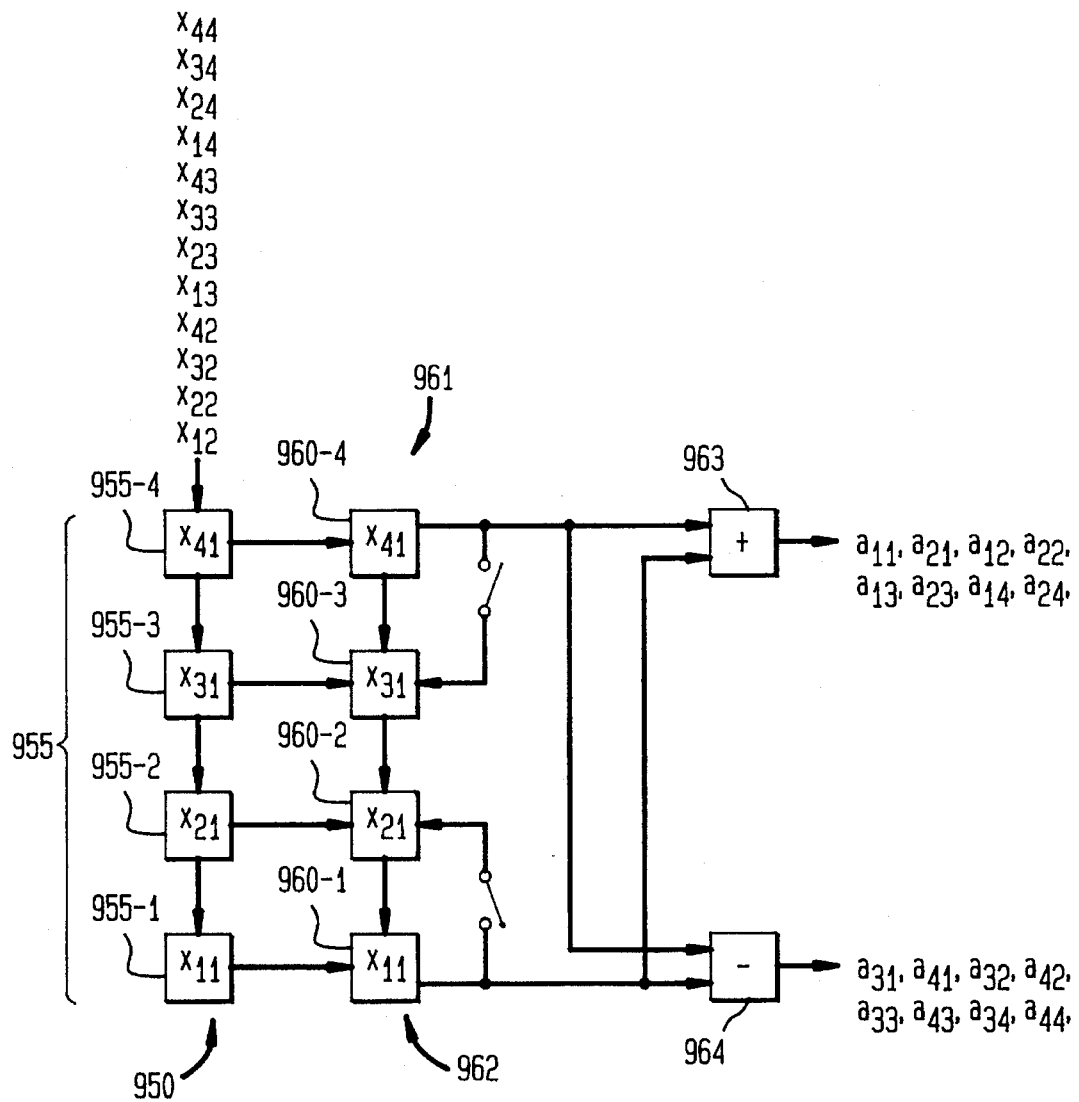
FIG. 6 depicts a pre-processing stage for performing a 4×4 DCT.

FIG. 6 shows an embodiment of the pre-processor circuit 950 capable of producing the sequences inputted to the circuits 220-1, . . . , 220-4 (FIG. 3). As shown, the pre-processor circuit 950 has four registers 955-1, 955-2, 955-3, 955-4 serially connected to form a shift register 955. Each column of elements of the matrix X (used to form the matrices $A_f$ and $A_r$) is successively shifted into in the shift register 955 in the order $x_{11}, x_{21}, \ldots, x_{41}, x_{12}, x_{22}, \ldots, x_{24}, \ldots, x_{44}$.

The pre-processor 950 also has two ring registers 961 and 962. The ring register 961 includes the registers 960-4 and 960-3 interconnected in a ring configuration. That is, the output of the register 960-4 is connected to the input of the register 960-3 and the output of the register 960-3 is connected to the input of the register 960-4. Similarly, the ring register 962 includes the registers 960-2 and 960-1 interconnected in a ring configuration. After an entire column is shifted into the column register 955, the column elements may be transferred to one of the two ring registers 961, 962. As shown, the element in the register 955-4 is transferred into the register 960-4, the element in the register 955-3 is transferred into the register 960-3, the element in the register 955-2 is transferred into the register 960-2 and the element in the register 955-1 is transferred into the register 960-1.

One register of each ring register 961 and 962, e.g., the registers 960-4 and 960-1, respectively, serves as the output of the ring register 961 or 962. Once in the ring register 961 or 962, the matrix elements may be rotated around the registers of the ring register so that each element is outputted from the ring register 961 or 962 (via the register 960-4 or 960-1) at least once.

The output of the ring registers 961 and 962 are connected to an adder circuit 963 and a subtraction circuit 964. The adder circuit 963 outputs the sum of the elements outputted by the ring registers 961, 962 to produce an element of the matrix $A_f$. The subtraction circuit 964 outputs the difference of the elements outputted by the ring register 962 and the ring register 961 to produce an element of the matrix $A_r$. Thus, it is possible to simultaneously generate the elements $a_{11}$ and $a_{31}$ by outputting the element $x_{41}$ from the ring register 961 and the element $x_{11}$ from the ring register 962. Likewise, the elements $a_{21}$ and $a_{41}$ can be simultaneously generated by outputting the element $x_{31}$ from the ring register 961 and the element $x_{21}$ from the ring register 962. Furthermore, the elements $a_{11}$, $a_{31}$ (and/or $a_{21}$, $a_{41}$) may be repeatedly generated a number of times by simply repeatedly outputting the same data in the ring registers 961, 962. Alternatively, or in addition, another column of the matrix X may be loaded into the ring registers to generate different elements of the matrices $A_f$ and $A_r$. As shown, the ring registers output each element therein only once so as to produce a sequence of elements of the matrix $A_f$ and a sequence of elements of the matrix $A_r$ without any repetitions.

Figure 7:
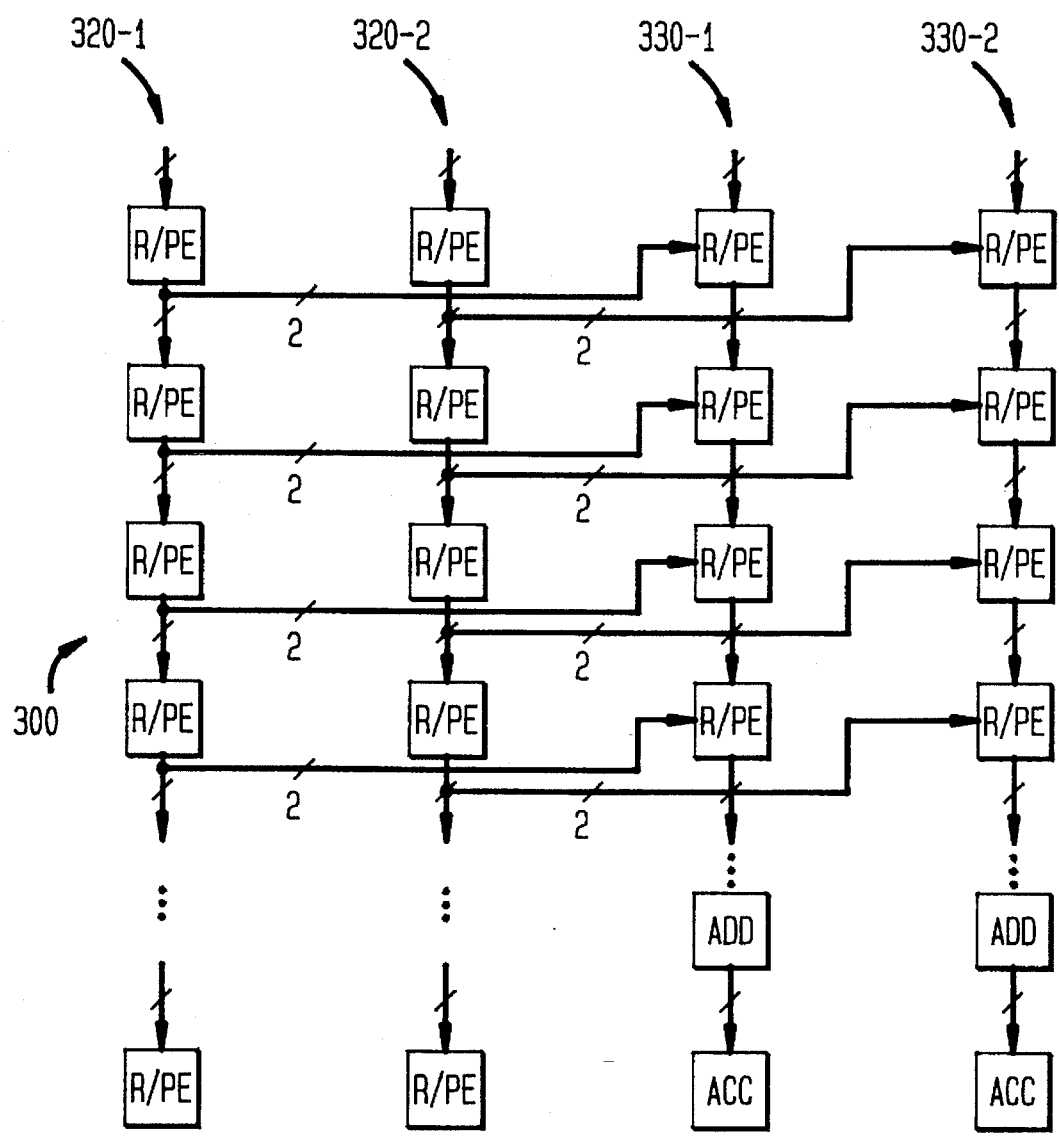
FIG. 7 depicts a 1-D DCT/IDCT processing stage according to a second embodiment of the invention.

FIG. 7 shows an alternative embodiment of the 1-D DCT processing stage 300 having 2K=2 column multiplication circuits. As shown, Q=1 column circuit 320-1 is provided for receiving Q=1 sequence of column elements of the matrix $A_f$ and Q=1 column circuit 320-2 is provided for receiving Q=1 sequence of column elements of the matrix $A_r$. Likewise, P=1 column circuit 330-1 is provided for receiving P=1 sequence of row elements of the matrix $C_1$ and P=1 column circuit 330-2 is provided for receiving P=1 sequence of row elements of the matrix $C_2$. The particular inputted sequences are shown in Table 5.

TABLE 5

| Circuit | Inputted Sequence |
|---|---|
| 320-1 | $a_{11},a_{21},a_{11},a_{21},a_{12},a_{22},a_{12},a_{22},a_{13},a_{23},a_{13},a_{23},a_{14},a_{24},a_{14},a_{24}$ |
| 320-2 | $a_{31},a_{41},a_{31},a_{41},a_{32},a_{42},a_{32},a_{42},a_{33},a_{43},a_{33},a_{43},a_{34},a_{44},a_{34},a_{44}$ |
| 330-1 | $c_{11},c_{12},c_{21},c_{22},c_{11},c_{12},c_{21},c_{22},c_{11},c_{12},c_{21},c_{22},c_{11},c_{12},c_{21},c_{22}$ |
| 330-2 | $c_{31},c_{32},c_{41},c_{42},c_{31},c_{32},c_{41},c_{42},c_{31},c_{32},c_{41},c_{42},c_{31},c_{32},c_{41},c_{42}$ |

Illustratively, the 2P=2 column circuits 330-1 and 330-2 are the 2K=2 column multiplication circuits and the column circuits 320-1 and 320-2 are column register circuits. In such a case, the circuits 330-1 and 330-2 produce the output shown in Table 6.

TABLE 6

| Circuit | Outputted Sequence |
|---|---|
| 330-1 | $c_{11}a_{11}+c_{12}a_{21}, c_{21}a_{11}+c_{22}a_{21}, c_{11}a_{12}+c_{12}a_{22}, c_{21}a_{12}+c_{22}a_{22},$ $c_{11}a_{13}+c_{12}a_{23}, c_{21}a_{13}+c_{22}a_{23}, c_{11}a_{14}+c_{12}a_{24}, c_{21}a_{14}+c_{22}a_{24}$ |
| 330-2 | $c_{31}a_{31}+c_{32}a_{41}, c_{41}a_{31}+c_{42}a_{41}, c_{31}a_{32}+c_{32}a_{42}, c_{41}a_{32}+c_{42}a_{42},$ $c_{31}a_{33}+c_{32}a_{43}, c_{41}a_{33}+c_{42}a_{43}, c_{31}a_{34}+c_{32}a_{44}, c_{41}a_{34}+c_{42}a_{44}$ |

Thus, the column circuit 330-1 outputs, in sequence, the elements of the first column of the matrix $Y_o$ followed by the second, third and fourth columns of the matrix $Y_o$. In a similar fashion, the column circuit 330-2 outputs the elements of the first column of the matrix $Y_e$ followed by the second, third and fourth columns of the matrix $Y_e$.

The performance of the 1-D DCT processing stage 300 is now analyzed. Each of the column circuits 320-1, 320-2, 330-1 and 330-2 receives a sequence of sixteen elements, one element per cycle. Thus, sixteen cycles are required for processing the matrices. If the processing must be performed in a particular time interval, the processing elements of the column circuits 330-1 and 330-2 must operate at twice the speed of the processing elements in the 1-D DCT processing stage 200 of FIG. 3. However, the 1-D DCT processing stage 300 requires only two column multiplication circuits. In comparison to a conventional circuit, the 1-D DCT processing stage 300 operates at the same speed as a conventional 1-D DCT processing stage with four column multiplication circuits despite having only two column multiplication circuits. Thus, the 1-D DCT processing stage 300 offers the same performance as a conventional 1-D DCT processing stage yet uses less space.

The pre-processing circuit 950 of FIG. 6 may be used to generate the sequences inputted to the column circuits 320-1 and 320-2. In this case, the ring registers 961 and 962 are used to output the elements therein twice. For example, the ring register 961 and 962 first output the elements $x_{41}$ and $x_{11}$, respectively to produce the elements $a_{11}$ and $a_{31}$. Then, the ring registers 961 and 962 output the elements $x_{31}$ and $x_{21}$ to produce the elements $a_{21}$ and $a_{41}$. Afterwards, the ring registers 961 and 962 once again output the elements $x_{41}$ and $x_{21}$, respectively to produce the elements $a_{11}$ and $a_{31}$. Likewise, the ring registers subsequently output the elements $x_{31}$ and $x_{21}$ to produce the elements $a_{21}$ and $a_{41}$. The next column of elements of the matrix X $x_{12}, x_{22}, x_{32}, x_{42}$ is then loaded into the ring registers 961 and 962 and the above process is repeated.

The 1-D DCT processing stages 300 (FIG. 7) and 200 (FIG. 3) could also be used for performing a 8×8 1-D DCT that has been reduced to a 4×4 DCT. Using a decimation technique, an 8×8 1-D DCT Y=CX is reduced to two 4×4 1-D DCT's $Y_e = C_1 \cdot A_f$ and $Y_o = C_2 \cdot A_r$ where:

$$Y_e = \begin{bmatrix} y_{21} & y_{22} & y_{23} & y_{24} & y_{25} & y_{26} & y_{27} & y_{28} \\ y_{41} & y_{42} & y_{43} & y_{44} & y_{45} & y_{46} & y_{47} & y_{48} \\ y_{61} & y_{62} & y_{63} & y_{64} & y_{65} & y_{66} & y_{67} & y_{68} \\ y_{81} & y_{82} & y_{83} & y_{84} & y_{85} & y_{86} & y_{87} & y_{88} \end{bmatrix},$$

$$Y_o = \begin{bmatrix} y_{12} & y_{12} & y_{13} & y_{14} & y_{15} & y_{16} & y_{17} & y_{18} \\ y_{31} & y_{32} & y_{33} & y_{34} & y_{35} & y_{36} & y_{37} & y_{38} \\ y_{51} & y_{52} & y_{53} & y_{54} & y_{55} & y_{56} & y_{57} & y_{58} \\ y_{71} & y_{72} & y_{73} & y_{74} & y_{75} & y_{76} & y_{77} & y_{78} \end{bmatrix}$$

-continued $$C_1 = \begin{bmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{bmatrix}, A_f = \begin{bmatrix} a_{11} & a_{12} & a_{13} & a_{14} & a_{15} & a_{16} & a_{17} & a_{18} \\ a_{21} & a_{22} & a_{23} & a_{24} & a_{25} & a_{26} & a_{27} & a_{28} \\ a_{31} & a_{32} & a_{33} & a_{34} & a_{35} & a_{36} & a_{37} & a_{38} \\ a_{41} & a_{42} & a_{43} & a_{44} & a_{45} & a_{46} & a_{47} & a_{48} \end{bmatrix}$$

$$C_2 = \begin{bmatrix} c_{51} & c_{52} & c_{53} & c_{54} \\ c_{61} & c_{62} & c_{63} & c_{64} \\ c_{71} & c_{72} & c_{73} & c_{74} \\ c_{81} & c_{82} & c_{83} & c_{84} \end{bmatrix}, A_r = \begin{bmatrix} a_{51} & a_{52} & a_{53} & a_{54} & a_{55} & a_{56} & a_{57} & a_{58} \\ a_{61} & a_{62} & a_{63} & a_{64} & a_{65} & a_{66} & a_{67} & a_{68} \\ a_{71} & a_{72} & a_{73} & a_{74} & a_{75} & a_{76} & a_{77} & a_{78} \\ a_{81} & a_{82} & a_{83} & a_{84} & a_{85} & a_{86} & a_{87} & a_{88} \end{bmatrix}$$

As before, each $a_{ij}$ of the matrix $A_f$ is given by:

$$a_{ij} = x_{ij} + x_{(N-i+1)j}; i=1,2,\ldots,N/2, j=1,2,\ldots,N$$

and each $a_{ij}$ of the matrix $A_r$ is given by:

$$a_{ij} = x_{(i-N/2)j} - x_{(3N/2-i+1)j}; i=N/2+1, N/2+2, \ldots, N.$$

In the case that the 1-D DCT processing stage 200 of FIG. 3 is used, the 1-D DCT stage 200 may receive the input sequences of Table 7 and output the sequences of Table 8.

TABLE 7

| Circuit | Inputted sequences |
|---|---|
| 220-1 | $a_{11},a_{21},a_{31},a_{41},a_{11},a_{21},a_{31},a_{41},a_{12},\ldots,a_{42},a_{13},\ldots,a_{43},a_{14},\ldots,$ |
| 220-2 | $a_{44},a_{15},\ldots,a_{45},a_{16},\ldots,a_{46},a_{17},\ldots,a_{47},a_{18},\ldots,a_{48}$ |
| 220-3 | $a_{51},a_{61},a_{71},a_{81},a_{51},a_{61},a_{71},a_{81},a_{52},\ldots,a_{82},a_{53},\ldots,a_{83},a_{54},\ldots,$ |
| 220-4 | $a_{84},a_{55},\ldots,a_{85},a_{56},\ldots,a_{86},a_{57},\ldots,a_{87},a_{58},\ldots,a_{88}$ |
| 230-1 | $c_{11},c_{12},c_{13},c_{14},c_{31},c_{32},c_{33},c_{34},\ldots$ (repeat 8 times) $\ldots,c_{34}$ |
| 230-2 | $c_{21},c_{22},c_{23},c_{24},c_{41},c_{42},c_{43},c_{44},\ldots$ (repeat 8 times) $\ldots,c_{44}$ |
| 230-3 | $c_{51},c_{52},c_{53},c_{54},c_{71},c_{72},c_{73},c_{74},\ldots$ (repeat 8 times) $\ldots,c_{74}$ |
| 230-4 | $c_{61},c_{62},c_{63},c_{64},c_{81},c_{82},c_{83},c_{84},\ldots$ (repeat 8 times) $\ldots,c_{84}$ |

TABLE 8

| Circuit | Outputted Sequences |
|---|---|
| 230-1 | $c_{11}a_{11}+c_{12}a_{21}+c_{13}a_{31}+c_{14}a_{41}$, $c_{31}a_{11}+c_{32}a_{21}+c_{33}a_{31}+c_{34}a_{41}$,..., $c_{11}a_{18}+c_{12}a_{28}+c_{13}a_{38}+c_{18}a_{48}$, $c_{31}a_{18}+c_{32}a_{28}+c_{33}a_{38}+c_{34}a_{48}$ |
| 230-2 | $c_{21}a_{11}+c_{22}a_{21}+c_{23}a_{31}+c_{24}a_{41}$, $c_{41}a_{11}+c_{42}a_{21}+c_{43}a_{31}+c_{44}a_{41}$,..., $c_{21}a_{18}+c_{22}a_{28}+c_{23}a_{38}+c_{24}a_{48}$, $c_{41}a_{18}+c_{42}a_{28}+c_{43}a_{38}+c_{44}a_{48}$ |
| 230-3 | $c_{51}a_{51}+c_{52}a_{61}+c_{53}a_{71}+c_{54}a_{81}$, $c_{71}a_{51}+c_{72}a_{61}+c_{73}a_{71}+c_{74}a_{81}$,..., $c_{51}a_{58}+c_{52}a_{68}+c_{53}a_{78}+c_{54}a_{88}$, $c_{71}a_{58}+c_{72}a_{68}+c_{73}a_{78}+c_{74}a_{88}$ |
| 230-4 | $c_{61}a_{51}+c_{62}a_{61}+c_{63}a_{71}+c_{64}a_{81}$, $c_{81}a_{51}+c_{82}a_{61}+c_{83}a_{71}+c_{84}a_{81}$,..., $c_{61}a_{58}+c_{62}a_{68}+c_{63}a_{78}+c_{64}a_{88}$, $c_{81}a_{58}+c_{82}a_{68}+c_{83}a_{78}+c_{84}a_{88}$ |

Each column multiplication circuit 230-1, 230-2 alternately outputs the elements of two different rows of the matrix $Y_o$ and each column multiplication circuit 230-3, 230-4 alternately outputs the elements of two different rows of the matrix $Y_e$. The 1-D DCT processing stage utilizes sixty-four clocks in processing the data yet only requires four column multiplication circuits 230-1, ... , 230-4. This processing speed can only be obtained using a conventional 1-D processing DCT stage with at least eight column multiplication circuits.

In the case that the 1-D DCT processing stage 300 (FIG. 7) is used, the 1-D DCT processing stage 300 may receive the inputted sequences of Table 9 and output the sequences of Table 10.

TABLE 9

| Circuit | Inputted Sequence |
|---|---|
| 320-1 | $a_{11},a_{21},a_{31},a_{41},a_{11}$ ... (repeat 4 times) ...,$a_{48}$ |
| 320-2 | $a_{51},a_{61},a_{71},a_{81},a_{51}$ ... (repeat 4 times) ...,$a_{88}$ |
| 330-1 | $c_{11},c_{12},c_{13},c_{14},c_{21},...,c_{44},...$ (repeat 8 times) ...,$c_{44}$ |
| 330-2 | $c_{51},c_{52},c_{53},c_{54},c_{61},...,c_{84},...$ (repeat 8 times) ...,$c_{84}$ |

TABLE 10

| Circuit | Outputted Sequence |
|---|---|
| 330-1 | $C_{11}a_{11}+c_{12}a_{21}+c_{13}a_{31}+c_{14}a_{41}$, $c_{21}a_{11}+c_{22}a_{21}+c_{23}a_{31}+c_{24}a_{41}$,..., $c_{41}a_{18}+c_{42}a_{28}+c_{43}a_{38}+c_{44}a_{48}$ |
| 330-2 | $c_{51}a_{51}+c_{52}a_{61}+c_{53}a_{71}+c_{54}a_{81}$, $c_{61}a_{51}+c_{62}a_{61}$, $c_{63}a_{71}+c_{64}a_{81}$,..., $c_{81}a_{58}+c_{82}a_{68}+c_{83}a_{78}+c_{84}a_{88}$ |

The processing requires one hundred twenty-eight clocks.

Figure 8A:
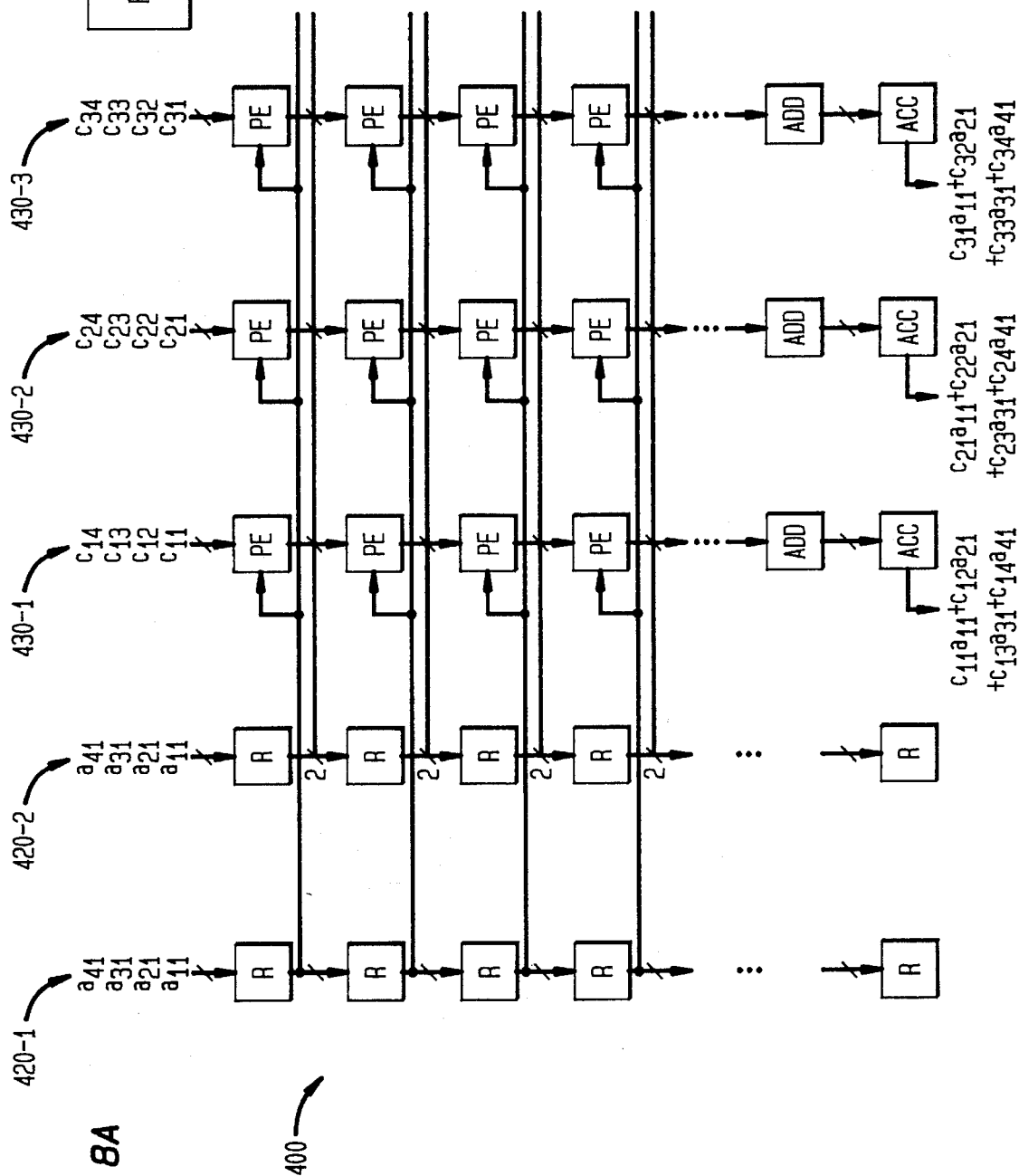
FIG. 8 depicts a 1-D DCT/IDCT processing stage according to a third embodiment of the invention.
Figure 8B:
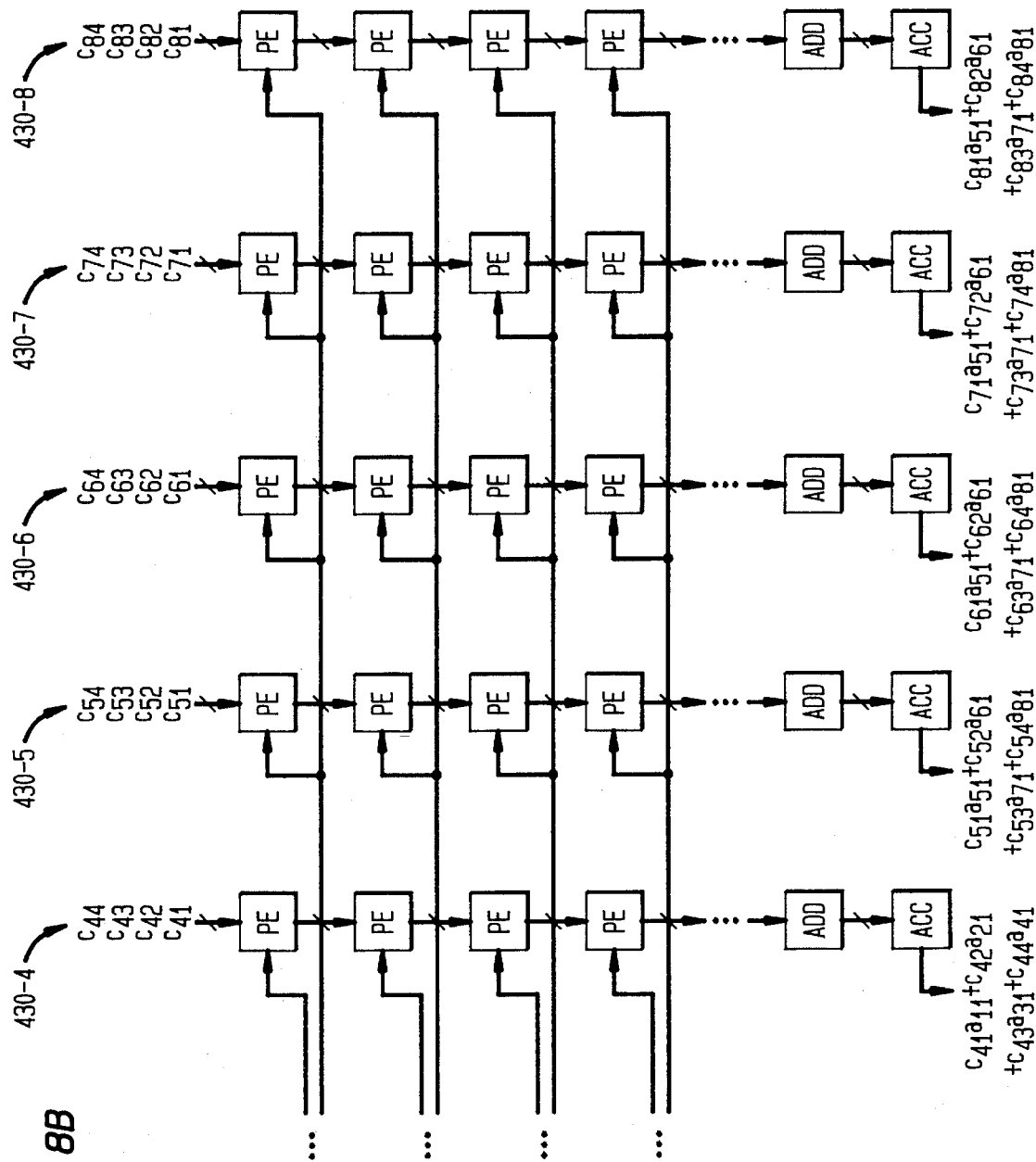

FIG. 8 shows yet another embodiment of the 1-D DCT processing stage 400 having 2K=8 column multiplication circuits 430-1, 430-2, 430-3, 430-4, 430-5, 430-6, 430-7 and 430-8 which illustratively receive 2P (where P=4) sequences of DCT cosine coefficient matrix elements. (Alternatively, the 2K=8 column multiplication circuits may receive 2Q sequences of elements of the matrices $A_f$ and $A_r$, where Q=4.) Two column register circuits 420-1 and 420-2 are also provided for receiving 2Q (where Q=1) sequences of elements of the matrices $A_f$ and $A_r$. Tables 11 and 12 summarize illustrative input and output sequences, respectively, for the 1-D DCT processing stage 400.

TABLE 11

| Circuit | Inputted Sequence |
|---|---|
| 420-1 | $a_{11}, a_{21}, a_{31}, a_{41}, a_{12},..., a_{48}$ |
| 420-2 | $a_{51}, a_{61}, a_{71}, a_{81}, a_{52},..., a_{88}$ |
| 430-1 | $c_{11}, c_{12}, c_{13}, c_{14},...$(repeat 8 times)..., $c_{14}$ |
| 430-2 | $c_{21}, c_{22}, c_{23}, c_{24},...$(repeat 8 times)..., $c_{24}$ |
| 430-3 | $c_{31}, c_{32}, c_{33}, c_{34},...$(repeat 8 times)..., $c_{34}$ |
| 430-4 | $c_{41}, c_{42}, c_{43}, c_{44},...$(repeat 8 times)..., $c_{44}$ |
| 430-5 | $c_{51}, c_{52}, c_{53}, c_{54},...$(repeat 8 times)..., $c_{54}$ |
| 430-6 | $c_{61}, c_{62}, c_{63}, c_{64},...$(repeat 8 times)..., $c_{64}$ |
| 430-7 | $c_{71}, c_{72}, c_{73}, c_{74},...$(repeat 8 times)..., $c_{74}$ |
| 430-8 | $c_{81}, c_{82}, c_{83}, c_{84},...$(repeat 8 times)..., $c_{84}$ |

TABLE 12

| Circuit | Outputted Sequence |
|---|---|
| 430-1 | $c_{11}a_{11}+c_{12}a_{21}+c_{13}a_{31}+c_{13}a_{41}$,..., $c_{11}a_{18}+c_{12}a_{28}+c_{13}a_{38}+c_{14}a_{48}$ |
| 430-2 | $c_{21}a_{11}+c_{22}a_{21}+c_{23}a_{31}+c_{24}a_{41}$,..., $c_{21}a_{18}+c_{22}a_{28}+c_{23}a_{38}+c_{24}a_{48}$ |
| 430-3 | $c_{31}a_{11}+c_{32}a_{21}+c_{33}a_{31}+c_{34}a_{41}$,..., $c_{31}a_{18}+c_{32}a_{28}+c_{33}a_{38}+c_{34}a_{48}$ |
| 430-4 | $c_{41}a_{11}+c_{42}a_{21}+c_{43}a_{31}+c_{44}a_{41}$,..., $c_{41}a_{18}+c_{42}a_{28}+c_{43}a_{38}+c_{44}a_{48}$ |
| 430-5 | $c_{51}a_{51}+c_{52}a_{61}+c_{53}a_{71}+c_{54}a_{81}$,..., $c_{51}a_{58}+c_{52}a_{68}+c_{53}a_{78}+c_{54}a_{88}$ |
| 430-6 | $c_{61}a_{51}+c_{62}a_{61}+c_{63}a_{71}+c_{64}a_{81}$,..., $c_{61}a_{58}+c_{62}a_{68}+c_{63}a_{78}+c_{64}a_{88}$ |
| 430-7 | $c_{71}a_{51}+c_{72}a_{61}+c_{73}a_{71}+c_{74}a_{81}$,..., $c_{71}a_{58}+c_{72}a_{68}+c_{73}a_{78}+c_{74}a_{88}$ |
| 430-8 | $c_{81}a_{51}+c_{82}a_{61}+c_{83}a_{71}+c_{84}a_{81}$,..., $c_{81}a_{58}+c_{82}a_{68}+c_{83}a_{78}+c_{84}a_{88}$ |

Thus, each column multiplication circuit 430-1, ..., 430-4 illustratively outputs one row of the matrix $Y_o$ and each column multiplication circuit 430-5, ..., 430-8 illustratively outputs one row of the matrix $Y_e$. The 1-D DCT processing stage utilizes thirty-two clock cycles to perform the 1-D DCT but requires eight column multiplication circuits 430-1 ..., 430-8.

FIG. 9 shows a pre-processor circuit 850 for an 8×8 1-D DCT stage 200, 300 or 400. The pre-processor 850 is analogous to the pre-processor 950 and thus is only described briefly. Each column of elements of an inputted matrix, e.g., the matrix X, is successively shifted into the shift register 855. The individual elements of a column stored in the registers 855-1, 855-2, 855-3, 855-4, 855-5, 855-6, 855-7 and 855-8 of the shift register 855 are transferred to corresponding registers 860-1, 860-2, 860-3, and 860-4 and 860-5, 860-6, 860-7, and 860-8 of ring registers 862 and 861, respectively.

The ring register 861 sequentially outputs each element stored therein one element per cycle. Simultaneously, the ring register 862 outputs the elements stored therein one element per cycle. Each element outputted by the ring registers 861 is added to a corresponding element outputted by the ring register 862 in the adder circuit 863 to produce the elements of a column of the matrix $A_f$. Likewise, each element outputted by the ring register 861 is subtracted, in a subtraction circuit 864, from a corresponding element simultaneously outputted by the ring register 862 to produce the elements of a column of the matrix $A_r$.

The elements stored in the ring registers 861 and 862 propagate around the individual registers 860-5, ..., 860-8 or 860-1, ..., 860-4. Thus, after outputting each element, the elements in the ring register 861 or 862 have returned to their original registers 860-5, ...,860-8 or 860-1, ...,860-4. It is thus possible to repeatedly output the elements from each ring register 861 and 862 a desired number of times. Meanwhile, another column of elements of the matrix X may be shifted into the shift register 855 for transfer into the ring registers 861 and 862.

Figure 10:
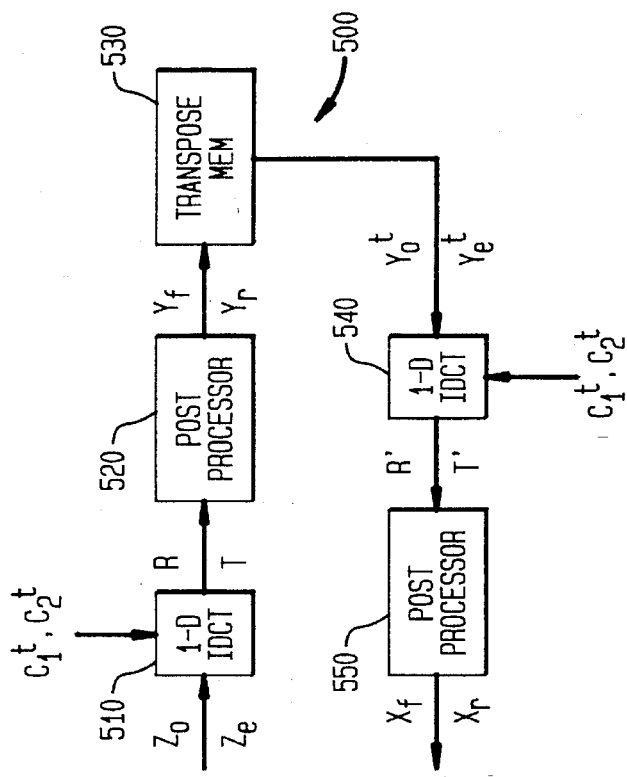
FIG. 10 depicts a 2-D IDCT circuit block diagram according to a second embodiment of the present invention.

FIG. 10 shows an architecture 500 according to another embodiment of the present invention for performing a 2-D IDCT. An N×N transformed matrix Z is divided into two N/2×N matrices $Z_o$ and $Z_e$ where $Z_o$ contains the odd rows of Z and $Z_e$ contains the even rows of Z. Each matrix $Z_o$ and $Z_e$ is simultaneously fed into a 1-D IDCT processing stage 510 which also receives the N/2×N/2 IDCT cosine coefficient matrices $C_1'$ and $C_2'$, where $C_1'$ and $C_2'$ are simply the transpose of $C_1$ and $C_2$, respectively. The 1-D IDCT processing stage outputs the matrices R and T where $R=C_1'Z_o$ and $T=C_2'Z_e$. A post-processor stage 520 receives the matrices R and T and outputs the matrices $Y_f=R+T$ and $Y_r=R-T$ where $Y_f$ contains the front rows of the matrix $Y=ZC'$, and $Y_r$ contains the recent rows of the matrix Y. The matrices $Y_f$ and $Y_r$ are received in transpose memory 530 which outputs the matrices $Y_o'$ and $Y_e'$ where $Y_o'$ contains the even rows of a matrix Y' (the transpose matrix of Y) and $Y_e'$ contains the odd rows of Y'. In a similar fashion as before, $Y_o'$, $Y_e'$, $C_1'$ and $C_2'$ are received in a 1-D IDCT processing stage 540 (similar to 1-D IDCT processing stage 520) which outputs the matrices R' and T', where $R'=C_1'Y_o'$ and $T'=C_2'Y_e'$. The matrices R' and T' are received in a post-processor stage 550 (which is similar to the post-processor stage 520) which outputs the matrices $X_f$ (front rows of the matrix X) and $X_r$ (recent rows of the matrix X) where $X_f=R'+T'$ and $X_r=R'-T'$.

The 1-D IDCT processing stages 510 and 540 are identical to the 1-D DCT processing stages 120 and 150 of FIG. 2 except that transposed cosine coefficient matrices $C_1'$ and $C_2'$ are used instead of cosine coefficient matrices $C_1$ and $C_2$. Thus, the 1-D IDCT processing stages 510 and 540 may be implemented using the circuits 200 (FIG. 3) 300 (FIG. 7) or 400 (FIG. 8). For example, suppose an 8×8 1-D IDCT is to be performed on a transformed matrix Z. Then $Z_o$, $Z_e$, $Y_f$, $Y_r$, R, and T, may be written in matrix form as:

$$Y_f = \begin{bmatrix} y_{11} & y_{12} & y_{13} & y_{14} & y_{15} & y_{16} & y_{17} & y_{18} \\ y_{21} & y_{22} & y_{23} & y_{24} & y_{25} & y_{26} & y_{27} & y_{28} \\ y_{31} & y_{32} & y_{33} & y_{34} & y_{35} & y_{36} & y_{37} & y_{38} \\ y_{41} & y_{42} & y_{43} & y_{44} & y_{45} & y_{46} & y_{47} & y_{48} \end{bmatrix},$$

$$Y_r = \begin{bmatrix} y_{51} & y_{52} & y_{53} & y_{54} & y_{55} & y_{56} & y_{57} & y_{58} \\ y_{61} & y_{62} & y_{63} & y_{64} & y_{65} & y_{66} & y_{67} & y_{68} \\ y_{71} & y_{72} & y_{73} & y_{74} & y_{75} & y_{76} & y_{77} & y_{78} \\ y_{81} & y_{82} & y_{83} & y_{84} & y_{85} & y_{86} & y_{87} & y_{88} \end{bmatrix},$$

$$Z_e = \begin{bmatrix} z_{21} & z_{22} & z_{23} & z_{24} & z_{25} & z_{26} & z_{27} & z_{28} \\ z_{41} & z_{42} & z_{43} & z_{44} & z_{45} & z_{46} & z_{47} & z_{48} \\ z_{61} & z_{62} & z_{63} & z_{64} & z_{65} & z_{66} & z_{67} & z_{68} \\ z_{81} & z_{82} & z_{83} & z_{84} & z_{85} & z_{86} & z_{87} & z_{88} \end{bmatrix},$$

$$Z_o = \begin{bmatrix} z_{11} & z_{12} & z_{13} & z_{14} & z_{15} & z_{16} & z_{17} & z_{18} \\ z_{31} & z_{32} & z_{33} & z_{34} & z_{35} & z_{36} & z_{37} & z_{38} \\ z_{51} & z_{52} & z_{53} & z_{54} & z_{55} & z_{56} & z_{57} & z_{58} \\ z_{71} & z_{72} & z_{73} & z_{74} & z_{75} & z_{76} & z_{77} & z_{78} \end{bmatrix},$$

$$C_1' = \begin{bmatrix} c_{11}' & c_{12}' & c_{13}' & c_{14}' \\ c_{21}' & c_{22}' & c_{23}' & c_{24}' \\ c_{31}' & c_{32}' & c_{33}' & c_{34}' \\ c_{41}' & c_{42}' & c_{43}' & c_{44}' \end{bmatrix}, \quad R = \begin{bmatrix} r_{11} & r_{12} & r_{13} & r_{14} & r_{15} & r_{16} & r_{17} & r_{18} \\ r_{21} & r_{22} & r_{23} & r_{24} & r_{25} & r_{26} & r_{27} & r_{28} \\ r_{31} & r_{32} & r_{33} & r_{34} & r_{35} & r_{36} & r_{37} & r_{38} \\ r_{41} & r_{42} & r_{43} & r_{44} & r_{45} & r_{46} & r_{47} & r_{48} \end{bmatrix}$$

$$C_2' = \begin{bmatrix} c_{51}' & c_{52}' & c_{53}' & c_{54}' \\ c_{61}' & c_{62}' & c_{63}' & c_{64}' \\ c_{71}' & c_{72}' & c_{73}' & c_{74}' \\ c_{81}' & c_{82}' & c_{83}' & c_{84}' \end{bmatrix}, \quad T = \begin{bmatrix} t_{11} & t_{12} & t_{13} & t_{14} & t_{15} & t_{16} & t_{17} & t_{18} \\ t_{21} & t_{22} & t_{23} & t_{24} & t_{25} & t_{26} & t_{27} & t_{28} \\ t_{31} & t_{32} & t_{33} & t_{34} & t_{35} & t_{36} & t_{37} & t_{38} \\ t_{41} & t_{42} & t_{43} & t_{44} & t_{45} & t_{46} & t_{47} & t_{48} \end{bmatrix}$$

Each element $y_{ij}$, i=1,1, ...,N/2, j=1,2, ...,N, of the matrix $y_f$ is given by $Y_{ij}=r_{ij}+t_{ij}$ and each element $y_{ij}$, i=N/2+1, N/2+2, ...,N, j=1,2, ...,N, of the matrix $Y_r$ is given by $y_{ij}=r_{(i-N/2)j}-t_{(i-N/2)j}$. Table 13 contains illustrative input sequences which may be fed to the 1-D stage 200 shown in FIG. 3 to produce the output sequences shown in Table 14.

TABLE 13

| Circuit | Inputted sequences |
|---|---|
| 220-1 | $z_{11},z_{31},z_{51},z_{71},z_{11},z_{31},z_{51},z_{71},z_{12},...,z_{72},z_{12},...,z_{72},...,z_{78}$ |
| 220-2 | |
| 220-3 | $z_{21},z_{41},z_{61},z_{81},z_{21},z_{41},z_{61},z_{81},z_{52},...,z_{82},z_{22},...,z_{82},...,z_{88}$ |

TABLE 13-continued

| Circuit | Inputted sequences |
|---|---|
| 220-4 | |
| 230-1 | $c_{11}^t,c_{12}^t,c_{13}^t,c_{14}^t,c_{31}^t,c_{32}^t,c_{33}^t,c_{34}^t,...$(repeat 8 times)...,$c_{34}$ |
| 230-2 | $c_{21}^t,c_{22}^t,c_{23}^t,c_{24}^t,c_{41}^t,c_{42}^t,c_{43}^t,c_{44}^t,...$(repeat 8 times)...,$c_{44}$ |
| 230-3 | $c_{51}^t,c_{52}^t,c_{53}^t,c_{54}^t,c_{71}^t,c_{72}^t,c_{73}^t,c_{74}^t,...$(repeat 8 times)...,$c_{74}$ |
| 230-4 | $c_{61}^t,c_{62}^t,c_{63}^t,c_{64}^t,c_{81}^t,c_{82}^t,c_{83}^t,c_{84}^t,...$(repeat 8 times)...,$c_{84}$ |

TABLE 14

| Circuit | Outputted Sequences |
|---|---|
| 230-1 | $c_{11}^t z_{11}+c_{12}^t z_{31}+c_{13}^t z_{51}+c_{14}^t z_{71}$, $c_{31}^t z_{11}+c_{32}^t z_{31}+c_{33}^t z_{51}+c_{34}^t z_{71}$,..., $c_{11}^t z_{18}+c_{12}^t z_{38}+c_{13}^t z_{58}+c_{18}^t z_{78}$, $c_{31}^t z_{18}+c_{32}^t z_{38}+c_{33}^t z_{58}+c_{34}^t z_{78}$ |
| 230-2 | $c_{21}^t z_{11}+c_{22}^t z_{31}+c_{23}^t z_{51}+c_{24}^t z_{71}$, $c_{41}^t z_{11}+c_{42}^t z_{31}+c_{43}^t z_{51}+c_{44}^t z_{71}$,..., $c_{21}^t z_{18}+c_{22}^t z_{38}+c_{23}^t z_{58}+c_{24}^t z_{78}$, $c_{41}^t z_{18}+c_{42}^t z_{38}+c_{43}^t z_{58}+c_{44}^t z_{78}$ |
| 230-3 | $c_{51}^t z_{21}+c_{52}^t z_{41}+c_{53}^t z_{61}+c_{54}^t z_{81}$, $c_{71}^t z_{21}+c_{72}^t z_{41}+c_{73}^t z_{61}+c_{74}^t z_{81}$,..., $c_{51}^t z_{28}+c_{52}^t z_{48}+c_{53}^t z_{68}+c_{54}^t z_{88}$, $c_{71}^t z_{28}+c_{72}^t z_{48}+c_{73}^t z_{68}+c_{74}^t z_{88}$ |
| 230-4 | $c_{61}^t z_{21}+c_{62}^t z_{41}+c_{63}^t z_{61}+c_{64}^t z_{81}$, $c_{81}^t z_{21}+c_{82}^t z_{41}+c_{83}^t z_{61}+c_{84}^t z_{81}$,..., $c_{61}^t z_{28}+c_{62}^t z_{48}+c_{63}^t z_{68}+c_{64}^t z_{88}$, $c_{81}^t z_{28}+c_{82}^t z_{48}+c_{83}^t z_{68}+c_{84}^t z_{88}$ |

Figure 11:
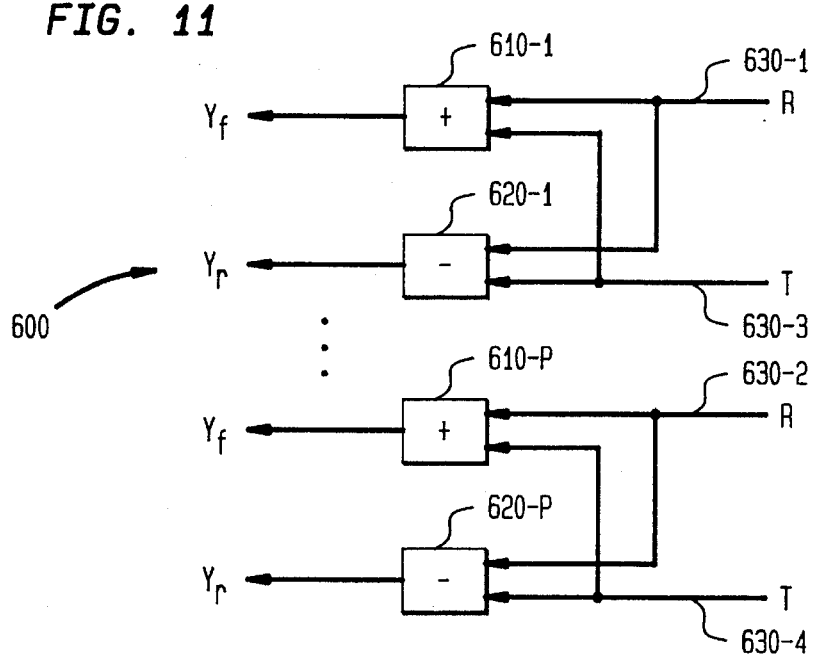
FIG. 11 depicts an illustrative post-processing stage shown in FIG. 10.

FIG. 11 shows an illustrative post-processing circuit 600 which may be used as the post-processing stage 520 or 550 in the circuit shown in FIG. 10. The post-processing circuit 600 illustratively includes an addition circuit 610-1 which adds together elements of the matrix R (e.g., outputted from the column multiplication circuit 230-1) with corresponding elements of the matrix T (e.g., outputted from the column multiplication circuit 230-3). The post-processing circuit 600 also includes a subtraction circuit 620-1 which subtracts elements of the matrix T from corresponding elements of the matrix R simultaneously inputted to the post-processing circuit 600. As shown, the addition circuit 610-1 outputs elements of the matrix $Y_f$ and the subtraction circuit outputs elements of the matrix $Y_r$.

(Illustratively, the post-processing circuit 600 has K addition-subtraction circuit configurations as described above. Each of these addition-subtraction circuit configurations, such as addition 610-K and subtraction circuit 620-K, receives the output of a different pair of column multiplication circuits of the 1-D IDCT processing stage. For example, the input 630-1 receives the elements outputted from the column multiplication circuit 230-1, the input 630-2 receives the elements outputted from the column multiplication circuit 230-2, the input 630-3 receives the elements outputted from the column multiplication circuit 230-3 and the input 630-4 receives the elements outputted from the column multiplication circuit 230-4.)

Figure 12:
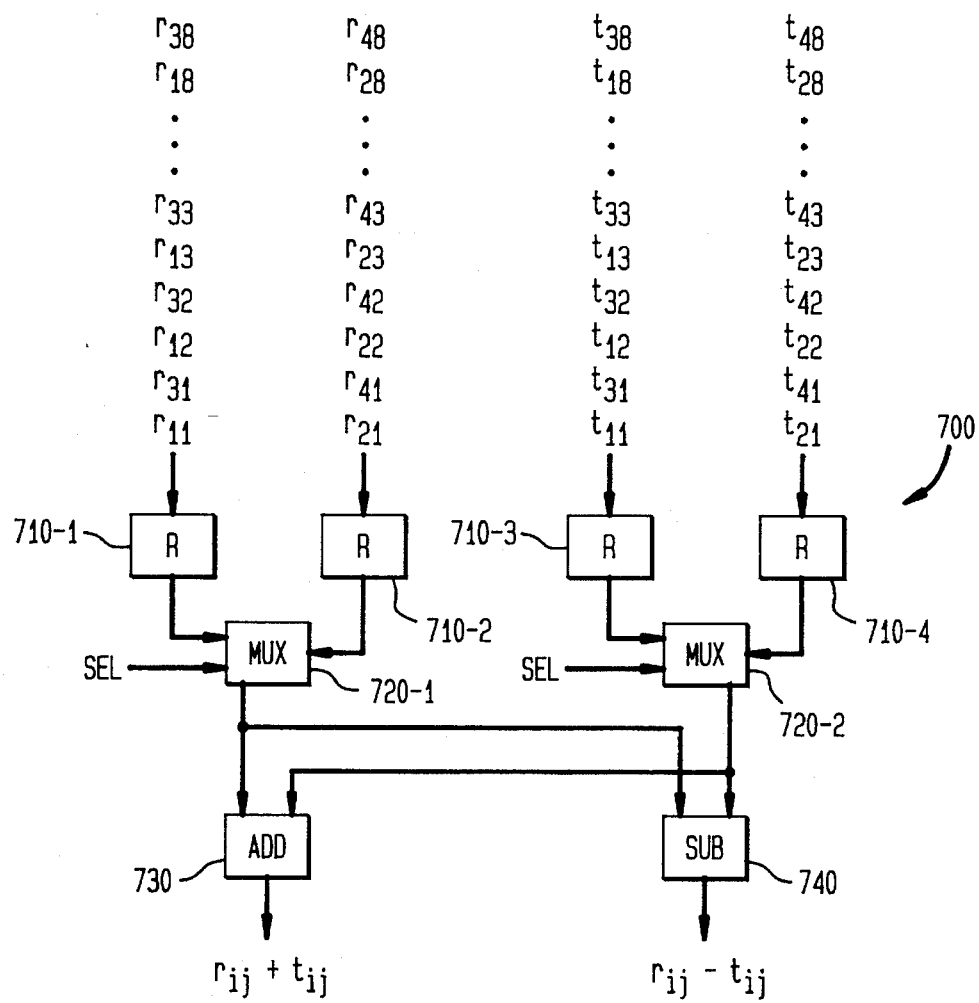
FIG. 12 depicts a second illustrative post-processing stage shown in FIG. 10.

FIG. 12 shows another illustrative post-processing circuit 700 which may be used as the post processing circuit 520 or 550 of FIG. 10. The post-processing circuit is designed to utilize fewer addition and subtraction circuits than the circuit 600 (FIG. 11). This is achieved by providing a first group of K registers for storing the elements of the matrix R and a second group of K registers for storing the elements of the matrix T outputted from each multiplication column circuit of the 1-D IDCT processing stage 510 or 540.

The embodiment of the post-processing circuit 700 shown in FIG. 12 is illustratively designed to be used with the 1-D processing stage 200 shown in FIG. 3. The post-processing circuit 700 includes four registers 710-1, 710-2, 710-3, and 710-4. That is, the circuit 700 has a first group of K=2 registers 710-1 and 710-2 for storing elements of the matrix R and a second group of K=2 registers 710-3 and 710-4 for storing elements of the matrix T outputted by the circuit 200 (FIG. 3). Each of the registers 710-1, 710-2, of the first group is connected to a corresponding column multiplication circuit 230-1 and 230-2 (FIG. 3) which outputs elements of the matrix R. Likewise, each of the registers 710-3, and 710-4 of the second group is connected to a corresponding column multiplication circuit 230-3, and 230-4 (FIG. 3) which outputs elements of the matrix T. The outputs of the registers 710-1 and 710-2 of the first group are connected to corresponding inputs of a multiplexer 720-1. Likewise, the outputs of the registers 710-3 and 710-4 of the second group are connected to corresponding inputs of a multiplexer 720-2. The output of the multiplexer 720-1 is connected to an input of an addition circuit 730 and a subtraction circuit 740. Similarly, the output of the multiplexer 720-2 is connected to an input of the addition circuit 730 and an input of the subtraction circuit 740.

Suppose the post-processor circuit 700 is used with a 1-D IDCT stage 200 to compute an 8×8 IDCT as discussed above. (The inputs to the registers 710-1 to 710-4 are summarized in Table 14). Every four cycles of the circuit 200, each of the registers 710-1 to 710-4 receives one element. The multiplexer 720-1 alternately selects the value stored in each register 720-1, 720-2 of the first group of K=2 registers. Simultaneously, the multiplexer 720-2 alternately selects the value stored in each of the second group of K=2 registers 720-3, 720-4. To that end, a select signal is applied to each multiplexer 720-1 and 720-2 to simultaneously select the values stored in the registers 710-1 and 710-3. A select signal is also subsequently applied to each each multiplexer 720-1 and 720-2 to simultaneously select the values stored in the registers 710-2 and 710-4. The values of the selected registers (i.e., 710-1 and 710-3 or 710-2 and 710-4) are simultaneously inputted to the addition circuit 730 to produce an element of the matrix Yf and to the subtraction circuit 740 to produce an element of the matrix $Y_r$.

Because each column multiplication circuit 230-1,...,230-4 (FIG. 3) requires four cycles to output each element of the matrix R or T, the multiplexers 720-1, 720-2, addition circuit 730 and subtraction circuit 740 need only operate at half the speed of the 1-D processing stage 200. For instance, a select signal may be applied to each multiplexer 720-1 and 720-2 every two cycles for selecting appropriate inputs to the addition circuit 730 and subtraction circuit 740. Furthermore, only one addition circuit 730 and one subtraction circuit 740 are required to compute the elements of the matrix Y.

In short, a DCT/IDCT circuit is disclosed which utilizes a combined decimation technique and pipelining technique. A DCT circuit according to the invention has a pre-processing stage receiving an N×N input matrix X and outputting two N/2×N matrices $A_f$ and $A_r$. The DCT circuit also has a 1-D DCT processing stage which receives the matrices $A_f$ and $A_r$ and outputs the matrices $Y_o = C_1 \cdot A_f$ and $Y_e = C_2 \cdot A_r$ where $C_1$ and $C_2$ are N/2×N/2 DCT cosine coefficient matrices. The DCT circuit according to the present invention therefore has the same performance as a conventional DCT circuit yet requires fewer column multiplication circuits in the 1-D DCT processing stages, thereby occupying less area on an IC chip. Specifically, a 1-D processing stage with 2K column multiplication circuits may be provided which utilizes $N^3/2K$ clocks for receiving each element of an inputted data sequence for processing.

The present invention has been disclosed with reference to specific illustrative embodiments. Numerous other embodiments may be devised by those having ordinary skill in the art without departing from the spirit and scope of the following claims.

I claim:

1. A DCT circuit comprising:

a pre-processor stage receiving each element $x_{ij}$ i,j=1,2,...,N, where N is an integer≧4, of an input matrix X, said pre-processor stage simultaneously outputting Q sequences of one or more columns of elements of a matrix $A_f$ having elements $a_{ij}=x_{ij}+x_{(N-i+1)j}$ i=1,2,... N/2, j=1,2,..., and Q≧1 of one or more sequences columns of elements of a matrix $A_r$ having elements $a_{ij}=x_{(i-N/2)j}-x_{(3N/2-i+1)j}$ i=N/2+1, N/2+2,...,N, j=1,2,...,N, where Q is an integer≧1, and a 1-D DCT processing stage simultaneously receiving each of said 2Q sequences of one or more vectors of elements of said matrices $A_f$ and $A_r$, P sequences of one or more rows of elements of an N/2×N/2 DCT cosine coefficient matrix $C_1$ and P sequences of rows of elements of an N/2×N/2 DCT cosine coefficient matrix $C_2$, where P is an integer≧1, said 1-D DCT processing stage comprising K column multiplication circuits which each simultaneously outputs a sequence of one or more vectors of elements of a matrix $Y_o$ comprising elements $y_{ij}$ i=1,3,...,N, j=1,2,...,N, where K is an integer≧1 and where $$y_{ij} = \sum_{k=1}^{\frac{N}{2}} C_{\frac{i+1}{2}, k} \times a_{kj}$$

and K column multiplication circuits which each simultaneously outputs a sequence of one or more vectors of elements of a matrix $Y_e$ comprising elements $y_{ij}$ i=2,4,...,N, j=1,2,...,N, where $$y_{ij} = \sum_{k=1}^{\frac{N}{2}} C_{(\frac{i+N}{2})k} \times a_{(k+\frac{N}{2})j}$$

wherein said integers Q, P and K are selected independently of said integer N, and wherein said integers K, P, and Q are selected to balance a processing speed of said 1-D DCT circuit against an area occupied by said 1-D DCT circuit.

2. The circuit of claim 1 wherein said 1-D DCT stage comprises a plurality of column register circuits, wherein each of said 2Q sequences of one or more columns of elements of said matrices $A_f$ and $A_r$ are received in column circuits of a first type and wherein each of said 2P sequences of one or more rows of elements of said matrices $C_1$ and $C_2$ are received in column circuits of a different type than said first type.

3. The circuit of claim 2 wherein each column register circuit comprises a plurality of serially connected registers for receiving one matrix element per clock cycle at a first one of said registers and for sequentially shifting said inputted matrix elements from register to register on each successive clock cycle.

4. The circuit of claim 3 wherein each column multiplication circuit comprises a plurality of sequentially connected processing elements, a first one of said processing elements receiving one matrix element per cycle, and outputting each of said received elements and a partial product of each received matrix element multiplied with a corresponding matrix element received in a first register of an associated column register circuit, each other processing element capable of receiving each of said matrix elements and said corresponding partial product from a previous processing element, one matrix element and partial product per cycle, said other processing elements also capable of performing part of a multiplication of said received matrix element and a matrix element received in a corresponding register of said associated column register and modifying said received partial product depending on said performed portion of said multiplication.

5. The circuit of claim 1 wherein each of said 2Q sequences outputted by said pre-processor stage comprises N/K repetitions of each column of elements comprised in each of said 2Q sequences.

6. The circuit of claim 1 wherein said 1-DCT stage utilizes $N^3/2K$ clocks for receiving each element of said 2Q sequences of elements.

7. The circuit of claim 1 wherein said integers Q and P are selected so that 2Q and 2P are powers of 2.

8. The circuit of claim 1 wherein said pre-processing circuit comprises:

first and second ring registers, each comprising N/2 registers linked via inputs and outputs thereof to form a ring register, an output of one of said N/2 registers serving as an output of said ring register, said first ring register receiving the elements in the first N/2 rows of each column of said matrix X and said second ring register receiving the elements in the last N/2 rows of each column of said matrix X, in reverse order, wherein each ring register successively outputs each received element at least once, an addition circuit for adding each matrix element outputted by said first ring register with a corresponding element outputted by said second ring register, and a subtraction circuit for subtracting each matrix element outputted from said second ring register from a corresponding matrix element outputted from said first ring register.

9. The DCT circuit of claim 1 further comprising:

a transpose memory receiving said matrices $Y_o$ and $Y_e$ and outputting a transpose matrix $Y'$ having elements $y_{ij}'=y_{ji}$ of said matrices $Y_e$ and $Y_o$, a second pre-processor stage receiving each element of said matrix $Y'$, said pre-processor stage simultaneously outputting Q sequences of one or more columns of elements of a matrix $A'_f$ having elements $a'_{ij}=y_{ij}'+y_{(N-i+1)j}'$ $i=1,2,\ldots,N/2$, $j=1,2,\ldots,N$, and Q sequences of one or more columns of elements to a matrix $A'_r$ having elements $a'_{ij}=y_{ij}'-y_{(i-N/2)j}'$ $i=N/2+1$, $N/2+2,\ldots,N$, $j=1,2,\ldots,N$, and a second 1-D DCT processing stage simultaneously receiving each of said 2Q sequences of one or more columns of elements of said matrices $A'_f$ and $A'_r$ outputted by said second pre-processor stage, P sequences of one or more rows of elements of said matrix $C_1$ and P sequences of rows of elements of said matrix $C_2$, said second 1-D DCT processing stage comprising K column multiplication circuits which each simultaneously outputs a sequence of one or more vectors of elements of a matrix $Z_o$ comprising elements $z_{ij}$ $i=1,3,\ldots,N$, $j=1,2,\ldots,N$, where $$z_{ij}=\sum_{k=1}^{\frac{N}{2}} c_{\frac{i+1}{2}\,k} \times a'_{kj}$$

and K column multiplication circuits which each simultaneously outputs a sequence of one or more vectors of elements of a matrix $Z_e$ comprising elements $z_{ij}$ $i=2,4,\ldots,N$, $j=1,2,\ldots,N$, where $$z_{ij}=\sum_{k=1}^{\frac{N}{2}} c_{\frac{i+N}{2}\,k} \times a'_{(k+\frac{N}{2})j}$$

10. An IDCT circuit comprising:

a 1-D IDCT processing stage simultaneously receiving Q sequences of one or more columns of elements $z_{ij}$ $i=1,3,\ldots,N$, $j=1,2,\ldots,N$, where N is an integer $\geq 4$ of a matrix $Z_o$, where Q is an integer $\geq 1$, Q sequences of one or more columns of elements $z_{ij}$ $i=2,4,\ldots,N$, $j=1,2,\ldots,N$, of a matrix $Z_e$, P sequences of one or more rows of elements of an $N/2\times N/2$ IDCT cosine coefficient matrix $C_1'$, where P is an integer $\geq 1$, and P sequences of rows of elements of an $N/2\times N/2$ DCT cosine coefficient matrix $C_2'$ said 1-D IDCT processing stage comprising K column multiplication circuits which each simultaneously outputs a sequence of one or more vectors of elements of a matrix R comprising elements $r_{ij}$ $i=1,2,\ldots,N/2$, $j=1,2,\ldots,N$, for a total of K sequences of one or more vectors of said matrix R, where K is an integer $\geq 1$ and where $$r_{ij}=\sum_{k=1}^{\frac{N}{2}} c^t_{ik} \times z_{(2k-1)j}$$

and K column multiplication circuits which each simultaneously outputs a sequence of one or more vectors of elements of a matrix T comprising elements $t_{ij}$ $i=1,2,\ldots,N/2$, $j=1,2,\ldots,N$, for a total of K sequences of one or more vectors of said matrix T, where $$t_{ij}=\sum_{k=1}^{\frac{N}{2}} c^t_{(i+\frac{N}{2})k} \times z_{(2k)j}$$

and wherein said integers Q, P and K are selected independently of said integer N, and wherein said integers Q, P and K are selected to balance a processing speed of said 1-D IDCT circuit against an area occupied by said 1-D IDCT circuit, a post-processing stage for receiving said 2K sequences of one or more vectors of said matrices R and T and for outputting elements of a matrix $Y_f$ having elements $y_{ij}$ $i=1,2,\ldots,N/2$, $j=1,2,\ldots,N$, where $y_{ij}=r+t_{ij}$ and elements of a matrix $Y_r$ having elements $y_{ij}$ $i=N/2+1$, $N/2+2,\ldots,N$, $j=1,2,\ldots,N$, where $y_{ij}=r_{(i-N/2)j}-t_{(i-N/2)j}$.

11. The IDCT circuit of claim 10 wherein said post-processing circuit comprises:

a first group of K parallel registers for receiving each element of a corresponding one of said K sequences of one or more vectors of elements of said matrix R, a second group of K parallel registers for receiving each element of a corresponding one of said K sequences of one or more vectors of elements of said matrix T, a first multiplexer for alternately selecting each element stored in each register of said first group of K registers, a second multiplexer for alternately selecting each [value] element stored in each register of said second group of K registers, an addition circuit for adding together said elements alternately selected by said first and second multiplexers, and a subtraction circuit for subtracting said elements alternately selected by said first multiplexer from said element selected by said second multiplexer.

12. The IDCT circuit of claim 10 further comprising:

a transpose memory receiving said matrices $Y_f$ and $Y_r$ and outputting Q sequences of one or more columns of a transpose matrix $Y_o'$ having elements $y_{ij}'$ $i=1,3,\ldots,N$, $j=1,2,\ldots,N$, where $y_{ij}'=y_{ji}$ of said matrices $Y_f$ and $Y_r$, and Q sequences of one or more columns of a transpose matrix $Y_e'$ having elements $y_{ij}'$ $i=2,4,\ldots,N$, $j=1,2,\ldots,N$, where $y_{ij}'=y_{ji}$ of said matrices $Y_f$ and $Y_r$, a second 1-D IDCT processing stage simultaneously receiving said 2Q sequences of one or more columns of elements of said matrices $Y_o'$ and $Y_e'$, P sequences of one or more rows of elements of said IDCT cosine coefficient matrix $C_1'$ and P sequences of rows of elements of said DCT cosine coefficient matrix $C_2'$, said second 1-D IDCT processing stage comprising K column multiplication circuits which each simultaneously outputs a sequence of one or more vectors of elements of a matrix R' comprising elements $r'_{ij}$ $i=1,2,\ldots,N/2$, $j=1,2,\ldots,N$, for a total of K sequences of one or more vectors said matrix R', where $$r'_{ij}=\sum_{k=1}^{\frac{N}{2}} c^t_{ik} \times y'_{(2k-1)j}$$

and K column multiplication circuits which each simultaneously outputs a sequence of one or more vectors of elements of a matrix T' comprising elements $t'_{ij}$ $i=1,2,\ldots$ ,N/2, j=1,2, ... ,N, for a total of K sequences of one or more vectors of said matrix T', where $$t'_{ij} = \sum_{k=1}^{\frac{N}{2}} c'_{(i+\frac{N}{2})k} \times y'_{(2k)j}$$

a second post-processing stage for receiving said 2K sequences of one or more vectors of said matrices R' and T' and for outputting elements of a matrix $X_f$ having elements $x_{ij}$ i=1,2,...,N/2, j=1,2,...,N, where each $x_{ij}=r'_{ij}+t'_{ij}$ and elements of a matrix $X_r$ having elements $x_{ij}$ i=N/2+1, N/2+2, j=1,2,...,N, where each $x_{ij}=r'_{(i-N/2)j}-t'_{(i-N/2)j}$.

13. The circuit of claim 10 wherein said post-processing circuit comprises:

K addition circuits, each addition circuit receiving, in parallel, a different one of said K sequences of one or more vectors of elements of said matrix R and a different one of said K sequences of one or more vectors of elements of said matrix T and outputting a sequence of unique vectors of elements of said matrix $Y_f$, and K subtraction circuits, each subtraction circuit receiving, in parallel, a different one of said K sequences of one or more vectors of elements of said matrix R and a different one of said K sequences of one or more vectors of elements of said matrix T and outputting a sequence of one or more unique vectors of elements of said matrix $Y_r$.

* * * * *